United States Patent
He et al.

(10) Patent No.: US 12,308,444 B2
(45) Date of Patent: May 20, 2025

(54) CARBON NANOMATERIAL SUPPORTED SINGLE ATOM CATALYSTS AND METHODS OF PREPARING SAME

(71) Applicant: Rutgers, The State University of New Jersey, New Brunswick, NJ (US)

(72) Inventors: Huixin He, New Brunswick, NJ (US); Qingdong Li, New Brunswick, NJ (US); Jenny Lockard, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 151 days.

(21) Appl. No.: 17/381,811

(22) Filed: Jul. 21, 2021

(65) Prior Publication Data

US 2022/0029173 A1    Jan. 27, 2022

Related U.S. Application Data

(60) Provisional application No. 63/054,817, filed on Jul. 22, 2020.

(51) Int. Cl.
*H01M 4/90* (2006.01)
*H01M 4/86* (2006.01)

(52) U.S. Cl.
CPC ....... *H01M 4/9008* (2013.01); *H01M 4/9083* (2013.01); *H01M 2004/8689* (2013.01)

(58) Field of Classification Search
CPC ............................ H01M 4/9008; H01M 4/9083
See application file for complete search history.

(56) References Cited

U.S. PATENT DOCUMENTS

| | | | |
|---|---|---|---|
| 10,305,114 B2 | 5/2019 | Liu et al. | |
| 10,844,501 B2 * | 11/2020 | Liu | C07C 29/158 |
| 12,053,765 B2 * | 8/2024 | Li | C07D 487/16 |
| 2012/0004098 A1 | 1/2012 | Xiao et al. | |
| 2018/0361370 A1 * | 12/2018 | Lin | B01J 31/2208 |
| 2019/0186029 A1 * | 6/2019 | Liu | B01J 37/086 |
| 2020/0123011 A1 | 4/2020 | He et al. | |
| 2021/0316289 A1 * | 10/2021 | Ma | B01J 37/04 |

FOREIGN PATENT DOCUMENTS

| | | | | |
|---|---|---|---|---|
| CN | 108336375 A | * | 7/2018 | .......... H01M 4/9041 |
| CN | 110102300 A | * | 8/2019 | ............. B01J 23/72 |

OTHER PUBLICATIONS

Zha et al. (Recent advances in the design strategies for porphyrin-based coordination polymers, CrystEngComm, 2014, 16, 7371-7384).*

Machine translation of Zhang et al. (CN110102300A), publication date Aug. 9, 2019.*

Liu et a (Chemical Adsorption Enhanced CO2 Capture and Photoreduction over a Copper Porphyrin Based Metal Organic Framework, ACS Appl. Mater. Interfaces 2013, 5, 7654-7658).*

(Continued)

*Primary Examiner* — Jun Li
(74) *Attorney, Agent, or Firm* — Saul Ewing LLP; Domingos J. Silva; Kathryn Doyle

(57) ABSTRACT

Provided herein are single atom catalysts embedded in carbon nanomaterials and microwave assisted methods of preparing the same.

9 Claims, 23 Drawing Sheets

(56) References Cited

OTHER PUBLICATIONS

Barkholtz, et al., "Advancements in rationally designed PGM-free fuel cell catalysts derived from metal-organic frameworks", Mater Horiz, 4(1), 2017, pp. 20-37.

Chen, et al., "Microwave-assisted shock synthesis of diverse ultrathin graphene-derived materials", Mater Chem Front, 3(7), 2019, pp. 1433-1439, Abstract Only.

Cui, et al., "A copper single-atom catalyst towards efficient and durable oxygen reduction for fuel cells", J Mater Chem A, 7(28), 2019, pp. 16690-16695, Abstract Only.

Fei, et al., "Atomic cobalt on nitrogen-doped graphene for hydrogen generation", Nature Comm, 6:8668, 2015.

Fei, "General synthesis and definitive structural identification of MN4C4 single-atom catalysts with tunable electrocatalytic activities", Nature Catalysis, 1(1), 2018, pp. 63-72.

Fei, et al., "Microwave-Assisted Rapid Synthesis of Graphene-Supported Single Atomic Metals", Adv Mater, vol. 30 (35), Aug. 29, 2018, e1802146.

Feng, et al., "Zirconium-Metalloporphyrin PCN-222: Mesoporous Metal-Organic Frameworks with Ultrahigh Stability as Biomimetic Catalysts", Angew Chem Int Ed, 51(41), 2012, pp. 10307-10310, Abstract Only.

Jiao, et al., "From MOFs to Single Fe Atoms Implanted N-doped Porous Carbons: Efficient Oxygen Reduction in Both Alkaline and Acidic Media", Angew Chem Int Ed, 57(28), 2018, pp. 8525-8529.

Kang, et al., "Efficient heat generation in large-area graphene films by electromagnetic wave absorption", 2D Mater, 4(2), 2017, pp. 025037, Abstract Only.

Khan, et al., "Synthesis of metal-organic frameworks (MOFs) with microwave or ultrasound: Rapid reaction, phase-selectivity, and size reduction", Coordination Chemistry Reviews, vol. 285, 2015, pp. 11-23, Abstract Only.

Kim, et al., "The Role of Layer-Controlled Graphene for Tunable Microwave Heating and Its Applications to the Synthesis of Inorganic Thin Films", ACS Appl Mater Interfaces, 8(8), 2016, pp. 5556-5562, Abstract Only.

Kitchen, et al., "Modern Microwave Methods in Solid-State Inorganic Materials Chemistry: From Fundamentals to Manufacturing", Chem Rev, 114(2), 2014, pp. 1170-1206.

Lai, et al., "MOF-Based Metal-Doping-Induced Synthesis of Hierarchical Porous Cu—N/C Oxygen Reduction Electrocatalysts for Zn-Air Batteries", Small, 13(30), 2017, pp. 11, Abstract Only.

Li, et al., "Bottom-Up Construction of Active Sites in a Cu—N4—C Catalyst for Highly Efficient Oxygen Reduction Reaction", ACS Nano, 13(3), 2019, pp. 3177-3187, Abstract Only.

Li, et al., "Fabrication of bioinspired enzymatic single-atom electrocatalysts using metal organic frameworks as precursors for oxygen reduction reactions in fuel cells", ACS Spring 2020 National Meeting & Exposition—Abstract, Pennsylvania Convention Center, Philadelphia, PA, Mar. 21-25, 2020 (meeting cancelled), 2020, 1 page, Abstract Only.

Li, et al., "Metal-organic frameworks: a promising platform for constructing non-noble electrocatalysts for the oxygen-reduction reaction", J Mater Chem A, 7(5), 2019, pp. 1964-1988.

Li, et al., "Transformation of the designed metal centers in a MOF to single atom catalytic sites via microwave heating", ACS Spring 2020 National Meeting & Exposition—Abstract, Philadelphia Convention Center, Philadelphia, PA, Mar. 21-25, 2020 (meeting cancelled), 2020, 1 page, Abstract Only.

Lin, et al., "Instantaneous Formation of Metal and Metal Oxide Nanoparticles on Carbon Nanotubes and Graphene via Solvent-Free Microwave Heating", ACS Appl Mater Interfaces, 3(5), 2011, pp. 1652-1664, Abstract Only.

Liu, et al., "Design Strategies toward Advanced MOF-Derived Electrocatalysts for Energy-Conversion Reactions", Adv Energy Mater, vol. 7, No. 23, 2017, pp. 1700518 (26 pgs).

Lu, et al., "Highly Dispersed Cu-NX Moieties Embedded in Graphene: A Promising Electrocatalyst towards the Oxygen Reduction Reaction", Chem Electro Chem, 5(21), 2018, pp. 3323-3329, Abstract Only.

Meng, et al., "Migration-Prevention Strategy to Fabricate Single-Atom Fe Implanted N-Doped Porous Carbons for Efficient Oxygen Reduction", Research, vol. 2019, 2019, pp. 1-12.

Patel, et al., "Microwave Enabled One-Pot, One-Step Fabrication and Nitrogen Doping of Holey Graphene Oxide for Catalytic Applications", Small, 11(27), 2015, pp. 3358-3368.

Qu, "Direct transformation of bulk copper into copper single sites via emitting and trapping of atoms", Nature Catalysis, 1(10), 2018, pp. 781-786.

Savaram, et al., "Dry microwave heating enables scalable fabrication of pristine holey graphene nanoplatelets and their catalysis in reductive hydrogen atom transfer reactions", Carbon, vol. 139, 2018, pp. 861-871.

Wu, et al., "Highly doped and exposed Cu(I)—N active sites within graphene towards efficient oxygen reduction for zinc-air batteries", Energy Environ Sci, 9(12), 2016, pp. 3736-3745, Abstract Only.

Yu, "Cu, N-codoped Hierarchical Porous Carbons as Electrocatalysts for Oxygen Reduction Reaction", ACS Appl Mater Interfaces, 8(33), 2016, pp. 21431-21439, Abstract Only.

Zhang, et al., "MOF-derived nanohybrids for electrocatalysis and energy storage: current status and perspectives", Chem Commun, 54(42), 2018, pp. 5268-5288, Abstract Only.

Zhang, et al., "Single Atomic Iron Catalysts for Oxygen Reduction in Acidic Media: Particle Size Control and Thermal Activation", J Am Chem Soc, 139(40), 2017, pp. 14143-14149, Abstract Only.

* cited by examiner

CARBON NANOMATERIAL SUPPORTED SINGLE ATOM CATALYSTS AND METHODS OF PREPARING SAME

CROSS-REFERENCE TO RELATED APPLICATIONS

The present application claims priority under 35 U.S.C. § 119(e) to U.S. Provisional Patent Application No. 63/054,817, filed Jul. 22, 2020, which is incorporated herein by reference in its entirety.

STATEMENT REGARDING FEDERALLY SPONSORED RESEARCH OR DEVELOPMENT

This invention was made with government support under DMR-1742807 and DMR-1455127 awarded by the National Science Foundation. The government has certain rights in the invention.

BACKGROUND

Single-atom catalysts (SACs) can simultaneously maximize the utilization of metal atoms and minimize side reactions, achieving high catalytic activity and selectivity, which are not attainable for conventional nanoparticle based catalysts. SACs have been intensively investigated for a wide range of reactions and great progress has been achieved. The drive to replace precious platinum group metal (PGM)-based catalysts has led to a class of SACs comprising sustainable and inexpensive PGM-free electrocatalysts for the sluggish oxygen reduction reaction (ORR). In these electrocatalysts, the catalytic centers comprise transition metal ions stabilized by nitrogen functional groups on carbonaceous surfaces ($M-N_xC_y$). Yet, despite recent advances, numerous challenges still remain before PGM-free SACs become viable for large-scale practical application in proton-exchange membrane fuel cells (PEMFCs).

Currently, iron-based single-atom catalysts (Fe-SACs) are the most promising and also most extensively studied PGM-free catalysts because of their encouraging ORR activity in acidic media. However, even the state of the art of Fe-SACs cannot satisfy the catalytic efficiency and long term durability requirements necessary for practical applications. There is a fundamental challenge for the carbon support to further improve these two critical performance parameters simultaneously. Specifically, to further increase their catalytic efficiency, a highly disordered and defective carbon matrix is necessary to increase the density of accessible catalytic sites. Additionally, downshifting the energy level of the d-state of the Fe centers is required to weaken the adsorption of ORR intermediates, thereby improving the activity of each of the Fe catalytic sites.

However, this defective carbon not only shows low conductivity, but also low stability against oxidation. In recent review articles, carbon matrix oxidation has been identified as the most important degradation mechanism of PGM-free catalysts in PEMFC cathodes. Carbon matrix oxidation can result in catalyst flooding and demetalization of the active centers. The released $Fe^I$ ions in turn catalyze the decomposition of the by-product of $H_2O_2$ and generate reactive oxidative species (ROS) via Fenton reaction. Consequently, these ROS species not only speed up the carbon matrix oxidation, but also attack the components of PEMFCs, such as the ionomer and membrane, which is detrimental to the catalyst and fuel cell devices.

On the other hand, defect-free graphene sheets are highly impervious against oxidative degradation, which is beneficial for long-term durability of a catalyst. Defect-free graphene sheets also provide high conductivity for assembling thick electrodes for practical applications. However, carbon matrices with low defects not only largely decrease the density of the catalytic centers, but also decrease the catalytic activity of each Fe center. The electron rich π-band of the large defect-free graphene domains upshifts the energy level of the d-orbital of the Fe centers, further strengthening the absorption the ORR intermediates. The dilemma leads to insurmountable fundamental challenges in the development of Fe-based SACs that simultaneously satisfy the requirements of high activity and durability necessary for practical applications.

Another challenge for practical application of SACs is the lack of simple and economical methods to synthesize SACs with densely and uniformly dispersed accessible active sites. Recently, metal-organic frameworks (MOFs) emerged as novel self-sacrificing precursors/templates to address these needs due to their built-in molecular level-controlled spatial arrangement of functional organic units, metallic sites, and porosity. However, current procedures for converting MOFs to E-SACs require a long and high temperature pyrolysis process under an inert or $NH_3$ environment. The time- and energy-consuming pyrolysis often leads to serious metal aggregation and/or formation of metal carbide and oxide nanoparticles, especially with the high metal loadings required to achieve high density of active sites. Even though some works reported that these metal particles might have played an auxiliary role to enhance the activity/selectivity of the electrocatalysts, in most cases, their existence deteriorates the activity and selectivity of SACs. Furthermore, the formation of such metal particles decreases the density of the SAC sites and adds difficulty to the study of the origin of catalytic activity and selectivity to necessary to guide future development. Removal of metal nanoparticles without dramatic loss of the activity of the SAC centers has been commonly achieved by including a post acid leaching treatment followed by an extra pyrolysis step. Therefore, it is highly desirable to develop a facile method to convert the metal species in a designed MOF precursor to active SAC centers without metal aggregation.

There is thus a need in the art for a SAC that can simultaneously satisfy the high ORR activity and durability requirements necessary for practical applications and for the development of a facile method to prepare SACs without metal aggregation. The present disclosure addresses these needs.

BRIEF SUMMARY OF THE INVENTION

In one aspect, the present invention provides a method of incorporating at least one single atom transition metal catalytic site in a carbon nanomaterial, the method comprising mixing a metal-porphyrin complex with at least one carbon nanomaterial to form a mixture and subjecting the mixture to microwave irradiation. In certain embodiments, the metal-porphyrin complex comprises Formula I:

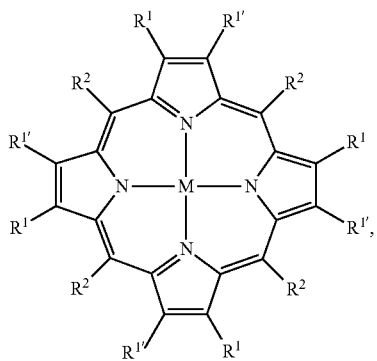

(I)

wherein the substituents are defined elsewhere herein. In certain embodiments, the transition metal catalytic site comprises Cu. In certain embodiments, the carbon nanomaterial is holey graphene. In certain embodiments, the metal-porphyrin complex further comprises a metal-organic framework (MOF). In certain embodiments, the MOF further comprises a $Zr_6$ octahedron cluster.

In another aspect, the present invention provides a single atom catalyst comprising a plurality of catalytic sites embedded in a holey carbon support, which comprises a plurality of nanoholes connected by nearly defect free graphene domains, wherein each of the plurality of catalytic sites independently comprises a transition metal center which is coordinated by four planar nitrogen atoms, wherein each nitrogen atom is bonded to the holey carbon, and each transition metal in each of the plurality of catalytic sites is not significantly aggregated with any other transition metal within the catalyst. In certain embodiments, the holey carbon support comprises holey graphene. In certain embodiments, the transition metal is Cu.

BRIEF DESCRIPTION OF THE FIGURES

The drawings illustrate generally, by way of example, but not by way of limitation, various embodiments of the present application.

FIG. 1A provides the XANES edge energy of CuMW, showing a Cu' oxidation state of Cu and a shakedown feature at 8986.3 eV indicating that the square planar geometry of Cu—$N_4$ in the Cu-porphyrin is largely preserved. FIG. 1B provides the EXAFS spectra of the CuMW, showing that the sample lacks the characteristic Cu—Cu peak, demonstrating a lack of metal aggregation.

FIG. 2A provides XANES spectra for CuTH, CuTH-1000, CuTH-1100, the original CuMOF, and Cu foil for comparison, revealing the presence of the edge shift as the characteristic Cu—Cu peak in the CuTH, CuTH-1000, and CuTH-1100 spectra. FIG. 2B provides the EXAFS spectra of CuMOF, CuTH, CuTH-1000, CuTH-1100, and Cu foil, demonstrating considerable Cu—Cu scattering present in CuTH, CuTH-1000, and CuTH-1100 species.

FIG. 3A provides the XANES spectra for CuTH, CuTHa, and Cu foil revealing that the edge shift for $Cu^0$ species is largely absent in CuTHa. FIG. 3B provides the EXAFS spectra of CuTH, CuTHa, and Cu foil, clearly demonstrating a diminished Cu—Cu scattering peak in CuTHa.

FIG. 4A provides the HAADF image of CuMOF before microwave irradiation. FIG. 4B shows the HAADF image of CuMOF after microwave irradiation. FIG. 4C shows the HAADF image of the holey graphene part of CuMW.

FIG. 5A provides a Raman spectrum of the original CuMOF. FIG. 5B provides a Raman spectrum of the MOF part in the CuMW. FIG. 5C provides a Raman spectrum of holey graphene. FIG. 5D provides a Raman spectrum of the holey graphene part of the CuMW. Taken together, FIGS. 5A-5D show that the active sites in the CuMW are incorporated in much larger nearly defect free graphene domains of holey graphene, which is much more conductive than that of the carbon matrix formed from carbonization of the CuMOF.

FIG. 10A shows ORR activity of several catalysts in basic media. FIG. 10B shows ORR activity of several catalysts in acidic media.

FIG. 11A provides cyclic voltammetry data of CuTH. FIG. 11B provides cyclic voltammetry data of CuTHa. FIG. 11C provides linear sweep voltammetry data of CuTH. FIG. 11D provides linear sweep voltammetry data of CuTHa.

FIG. 12A provides the cyclic voltammetry data of CuMW in both Ar-saturated and $O_2$-saturated 0.1 M KOH and 0.1 M $HClO_4$, demonstrating activity in the reduction of $O_2$ in both basic and acidic media. FIG. 12B provides linear sweep voltammetry data of CuMW demonstrating an apparent electron transfer number of about 4 at 0.5 V (vs. RHE) indicating an apparent 4e pathway for oxygen reduction. FIG. 12C provides linear sweep voltammetry data of CuMW showing disk current density (solid line) and ring current (dash line) in $O_2$-saturated 0.1 M KOH and 0.1 M $HClO_4$, showing lower catalytic activity with much higher selectivity toward water in acidic media. FIG. 12D provides electron transfer number (solid line) and hydrogen peroxide percentage (dash line) of CuMW in both acidic and basic conditions, and Pt/C under basic conditions, demonstrating higher selectivity for a 4 electron pathway in acidic media.

FIG. 16A provides cyclic voltammetry of FeMW in Ar-saturated and $O_2$-saturated 0.1 M KOH. FIG. 16B provides linear sweep voltammetry data at 1600 rpm, recording both disk and ring current. FIG. 16C provides linear sweep voltammetry data at various rotation speeds with a scan rate of 10 mV/s. FIG. 16D provides a K-L plot of rotation disk electrode data. FIG. 16E provides electron transfer number and the percentage of oxygen that is converted to peroxide.

(FIG. 18A) 18 k magnification; (FIG. 18B) 35 k magnification.

DETAILED DESCRIPTION OF THE INVENTION

Figure 1A:
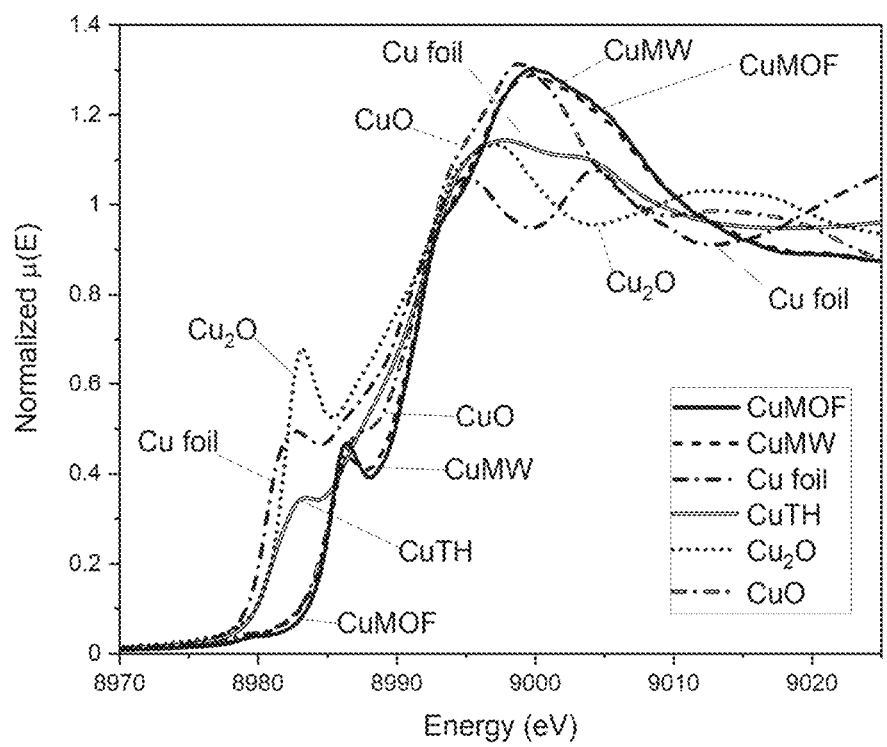
FIG. 1A-1B provide XANES and EXAFS spectra of several materials, providing electronic and structural data about the Cu sites within the materials.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$) hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CCH$_2$, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth. Likewise a $C_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The terms "epoxy-functional" or "epoxy-substituted" as used herein refers to a functional group in which an oxygen atom, the epoxy substituent, is directly attached to two adjacent carbon atoms of a carbon chain or ring system. Examples of epoxy-substituted functional groups include, but are not limited to, 2,3-epoxypropyl, 3,4-epoxybutyl, 4,5-epoxypentyl, 2,3-epoxypropoxy, epoxypropoxypropyl, 2-glycidoxyethyl, 3-glycidoxypropyl, 4-glycidoxybutyl, 2-(glycidoxycarbonyl)propyl, 3-(3,4-epoxycylohexyl)propyl, 2-(3,4-epoxycyclohexyl)ethyl, 2-(2,3-epoxycylopentyl)ethyl, 2-(4-methyl-3,4-epoxycyclohexyl)propyl, 2-(3,4-epoxy-3-methylcylohexyl)-2-methylethyl, and 5,6-epoxyhexyl.

The term "monovalent" as used herein refers to a substituent connecting via a single bond to a substituted molecule. When a substituent is monovalent, such as, for example, F or Cl, it is bonded to the atom it is substituting by a single bond.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are integers and mean having any of a to b number of carbon atoms. For example, $(C_1\text{-}C_4)$hydrocarbyl means the hydrocarbyl group can be methyl ($C_1$), ethyl ($C_2$), propyl ($C_3$), or butyl ($C_4$), and $(C_0\text{-}C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "room temperature" as used herein refers to a temperature of about 15° C. to 28° C.

The term "single atom catalyst" or "SAC" as used herein refers to a class of catalysts in which a catalytically active isolated metal atom is anchored to a support.

The term "metal-organic framework" or "MOF" as used herein refers to a class of crystalline materials that comprise coordination bonds between metal cationic clusters and multidentate organic linkers to form a highly ordered three-dimensional structure.

The term "porphyrin" as used herein refers to a compound in a class of heterocyclic macrocycles comprising at least four optionally substituted aromatic heterocyclyl subunits connected at two α-positions of each respective heterocyclyl subunit by a methyne (=CH—) to form a continuous planar macrocycle, wherein each heterocyclyl subunit possesses at least one heteroatom at an internal position of the macrocyclic structure.

The term "porphyrin-metal complex" as used herein refers to coordination complex comprising a multidentate porphyrin species and a metal species, wherein the metal species is held at a central position of the porphyrin species by at least a tetradentate coordination of the porphyrin species to the metal center.

The term "carbon nanomaterials" as used herein refers to a material containing particles with at least one dimension between 1 and 100 nm in size primarily comprised of carbon. Non-limiting examples of carbon nanomaterials include graphene, holey graphene, carbon nanotubes, carbon black, active carbon, graphyne, and graphdiyne.

The term "microwave absorbing species" as used herein refers to a material that can dissipate microwave radiation by converting electromagnetic radiation into thermal energy.

The term "holey carbon" as used herein refers to a carbon nanomaterial comprising nearly defect-free graphene domains with at least one nanohole in at least one contiguous graphene domain. Non-limiting examples of holey carbon include holey graphene and holey carbon nanotubes.

The term "metal aggregate" as used herein refers to any compound, species, or nanoparticle that comprises a metal-metal bond involving a transition metal selected from the group consisting of Cr, Mo, W, Mn, Tc, Re, Fe, Ru, Os, Co, Rh, Ir, Ni, Pd, Pt, Cu, Ag, and Au.

The term "GIC" as used herein, refers to a graphite intercalation compound.

The term "hG/CNT" as used herein refers to a mixture of holey graphene (hG) and carbon nanotube mixture (CNT).

DESCRIPTION

The present disclosure relates in one aspect to a time and energy efficient approach to the fabrication of electrochemical single atom catalysts (E-SACs) without metal aggregation, employing microwave assisted pyrolysis of a porphyrin-metal complex. In certain embodiments, the metal-porphyrin complex further comprises a metal-organic framework (MOF). In one aspect, this approach is predicated on the fast heating and cooling capability of microwave heating, which quickly carbonizes the organic linkers to a conductive carbon network, leaving minimal time for metal atoms to diffuse, such that all of the designed metallic sites are converted to single atom catalytic sites. In another aspect, this approach is predicated on the rapidly achieved high temperature generated by microwave heating causing ejection of the metal-porphyrin complex or separated metal and porphyrin species from the MOF. The ejected species are consequently doped into the in situ generated vacancies in the microwave absorbing carbon nanomaterials to form the single atom catalytic sites. In certain embodiments, this synthetic approach avoids the issues related to metal aggregation and the post-treatment procedures associated with the formation of metal nanoparticles/aggregates.

Microwave heating is often used to facilitate organic reactions and to fabricate various nanomaterials, including MOF particles, but has not been used as a means for MOF pyrolysis for E-SAC fabrication. Many compounds, including MOFs, are microwave transparent and therefore cannot be directly pyrolyzed via microwave heating. Incorporation of microwave absorbing species (e.g., carbon nanotubes, graphene, graphyne, and graphdiyne, inter alia) to the reaction system enables microwave assisted reactions involving chemical species that are microwave transparent. Multilayer graphene, including holey graphene, due to its high electron conductivity, is able to efficiently convert microwave energy to heat, quickly generating a high temperature. Upon microwave irradiation of a metal-porphyrin species in the presence of at least one microwave absorbing species a high temperature thermal shock is generated, providing an E-SAC without the formation of metal aggregates.

In another aspect, the present disclosure relates to a single-atom catalyst with transition metal catalytic sites embedded in the basal planes of pristine holy-graphene nanoplatelets. In certain embodiments, such E-SACs exhibit excellent catalytic activity and selectivity in reducing oxygen to water in both acidic and alkaline media, as compared to E-SACs fabricated with an amorphous carbon matrix.

In certain embodiments, the present disclosure provides a method of incorporating single atom transition metal catalytic sites in carbon nanomaterials, comprising mixing a metal-porphyrin complex with at least one carbon nanomaterial to form a mixture, and subjecting the mixture to microwave irradiation.

In certain embodiments, the metal-porphyrin complex has the structure of Formula I:

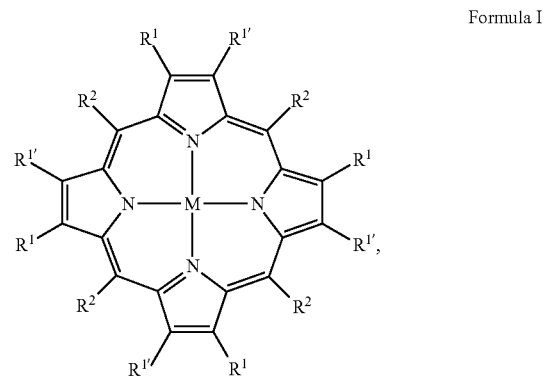

Formula I wherein:
$R^1$ and $R^{1'}$ are each independently selected from the group consisting of H, C(=O)OR, C(=O)NR$_2$, C$_1$-C$_{10}$ alkyl, and C$_6$-C$_{10}$ aryl,
  wherein each adjacent pair of $R^1$ and $R^{1'}$ optionally independently combines to form an optionally substituted phenyl ring or optionally substituted C$_4$-C$_8$ cycloalkyl or C$_5$-C$_8$ cycloalkenyl ring (wherein the formed ring is fused to the pyrrole ring to which $R^1$ and $R^{1'}$ are attached),
  wherein the C$_6$-C$_{10}$ aryl and C$_1$-C$_{10}$ alkyl are each optionally substituted with at least one substituent independently selected from the group consisting of F, Cl, Br, I, CN, NO$_2$, OMe, C(=O)OR, and C(=O)NR$_2$;

each occurrence of $R^2$ is independently selected from the group consisting of H, C(=O)OR, C(=O)NR$_2$, $C_1$-$C_{10}$ alkyl, and $C_6$-$C_{10}$ aryl, wherein the $C_6$-$C_{10}$ aryl and $C_1$-$C_{10}$ alkyl are each optionally substituted by at least one substituent independently selected from the group consisting of OMe, C(=O)OR, and C(=O)NR$_2$, each occurrence of R is independently selected from the group consisting of H and $C_1$-$C_{10}$ alkyl; and M is a transition metal.

In certain embodiments, the metal-porphyrin complex has the structure of Formula II:

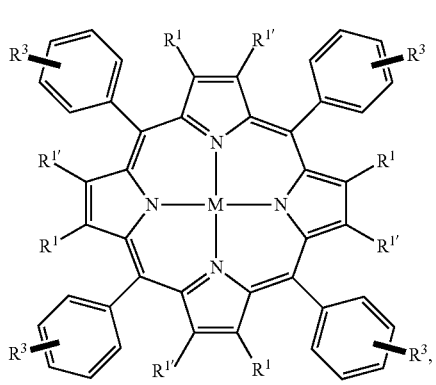

Formula II wherein:

$R^1$ and $R^{1'}$ are each independently selected from the group consisting of H, $C_1$-$C_{10}$ alkyl, and $C_6$-$C_{10}$ aryl, wherein each adjacent pair of $R^1$ and $R^{1'}$ optionally independently combines to form an optionally substituted phenyl ring or optionally substituted $C_4$-$C_8$ cycloalkyl or $C_5$-$C_8$ cycloalkenyl ring (wherein the formed ring is fused to the pyrrole ring to which $R^1$ and $R^{1'}$ are attached), wherein the $C_6$-$C_{10}$ aryl and $C_1$-$C_{10}$ alkyl are each optionally substituted with at least one substituent independently selected from the group consisting of F, Cl, Br, I, CN, NO$_2$, OMe, C(=O)OR, and C(=O)NR$_2$;

each occurrence of $R^3$ is independently selected from the group consisting of H, C(=O)OR, and C(O)NR$_2$, wherein each $R^3$ is independently substituted at any one of the ortho, meta, or para positions of the corresponding phenyl ring to which the $R^3$ is bonded, each occurrence of R is independently selected from the group consisting of H and $C_1$-$C_{10}$ alkyl; and wherein M is a transition metal selected from the group consisting of Cr, Mo, W, Mn, Tc, Re, Fe, Ru, Os, Co, Rh, Ir, Ni, Pd, Pt, Cu, Ag, and Au In other embodiments, the metal-porphyrin complex has the structure of Formula III:

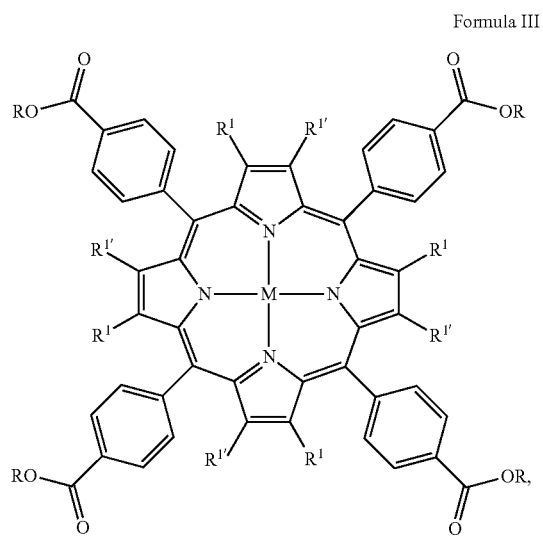

Formula III wherein $R^1$ and $R^{1'}$ are each independently selected from the group consisting of H, $C_1$-$C_{10}$ alkyl, and $C_6$-$C_{10}$ aryl, wherein each adjacent pair of $R^1$ and $R^{1'}$ optionally independently combines to form an optionally substituted phenyl ring or optionally substituted $C_4$-$C_8$ cycloalkyl or $C_5$-$C_8$ cycloalkenyl ring (wherein the formed ring is fused to the pyrrole ring to which $R^1$ and $R^{1'}$ are attached), wherein the $C_6$-$C_{10}$ aryl and $C_1$-$C_{10}$ alkyl are each optionally substituted by at least one substituent independently selected from the group consisting of F, Cl, Br, I, CN, NO$_2$, and OMe;

each occurrence of R is independently selected from the group consisting of H or $C_1$-$C_{10}$ alkyl; and wherein M is a transition metal selected from the group consisting of Cr, Mo, W, Mn, Tc, Re, Fe, Ru, Os, Co, Rh, Ir, Ni, Pd, Pt, Cu, Ag, and Au.

In certain embodiments the metal-porphyrin complex comprises Formula III, wherein $R^1$ and $R^{1'}$ are each independently H. In certain embodiments, the metal-porphyrin complex comprises Formula III, wherein each R is independently H. In certain embodiments, the metal-porphyrin complex comprises Formula III, wherein M is Cu. In certain embodiments, the metal-porphyrin complex comprises Formula III, wherein M is Fe.

In certain embodiments, the metal-porphyrin complex further comprises a metal-organic framework (MOF). In other embodiments, the metal-organic framework further comprises a Zr$_6$ octahedron cluster.

In certain embodiments, the transition metal is selected from the group consisting of Cr, Mo, W, Mn, Tc, Re, Fe, Ru, Os, Rh, Ir, Ni, Pd, Pt, Cu, Ag, and Au. In other embodiments, the transition metal is Cu. In yet other embodiments, the transition metal is Fe.

In certain embodiments, the carbon nanomaterial is a microwave absorbing species. In certain embodiments, the carbon nanomaterial is selected from the group consisting of graphene, holey graphene, carbon nanotubes, carbon black, active carbon, graphyne, and graphdiyne.

In certain embodiments, the method further comprises a second carbon nanomaterial. In certain embodiments the second carbon nanomaterial is a microwave absorbing species. In certain embodiments, the microwave absorbing species is selected from the group consisting of graphene, holey graphene, carbon nanotubes, carbon black, active carbon, graphyne, and graphdiyne.

In certain embodiments, the mixture further comprises a solvent. In certain embodiments, the solvent is ethanol. In other embodiments, the solvent is isopropanol. In certain embodiments, the solvent is at least partially removed before subjecting the mixture to microwave irradiation. In other embodiments, the at least partial removal of solvent comprises heating the mixture to a temperature above about 78° C.

In certain embodiments, the frequency of the electromagnetic radiation used ranges from $10^8$ to $10^{11}$ Hertz (Hz). In other embodiments, the microwave irradiation occurs with a frequency of 2.45 GHz. The input power is selected to provide the desired heating rate. In certain embodiments, the microwave irradiation occurs with an output power in the range of 150 to 300 W. In other embodiments, the microwave irradiation occurs with an output power of 300 W. In certain embodiments, the microwave irradiation has a duration in the range of 3 to 30 seconds. In other embodiments, the microwave irradiation has a duration of 5 seconds. In other embodiments, the microwave irradiation occurs in a single mode. The electromagnetic radiation may be pulsed or continuous. When using pulsed radiation, any arrangement of pulse duration and pulse repetition frequency which allows for sufficient heating to result in pyrolysis while simultaneously allowing the dissipation of adverse heat buildup may be used in certain embodiments of the present invention. The pulse duration may be varied, from 1 to 100 microseconds and the pulse repetition frequency from 2 to 1000 pulses per second. The sample may be irradiated for any period of time sufficient to pyrolyze a sample. These conditions can be readily determined by one of ordinary skill in the art without undue experimentation. The time required to achieve the result will be shorter for higher power settings.

In certain embodiments, the present invention is a single atom catalyst comprising a plurality of catalytic sites embedded in a holey carbon support which comprises a plurality of nanoholes connected by nearly defect free graphene domains, wherein each of the plurality of catalytic sites comprises a transition metal which is coordinated by four planar nitrogen atoms, wherein each nitrogen atom is bonded to the holey carbon, and each transition metal in each of the plurality of catalytic sites is not significantly aggregated with any other transition metal within the catalyst.

In certain embodiments, the holey carbon support comprises holey graphene. In certain embodiments, the transition metal is selected from the group consisting of Cr, Mo, W, Mn, Tc, Re, Fe, Ru, Os, Co, Rh, Ni, Pd, Pt, Cu, Ag, and Au. In other embodiments, the transition metal center is Cu. In yet other embodiments, the transition metal is Fe.

EXAMPLES

The disclosure is now described with reference to the following Examples. These Examples are provided for the purpose of illustration only and the disclosure should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the compounds of the present disclosure and practice the claimed methods. The following working examples therefore, specifically point out selected embodiments of the present disclosure, and are not to be construed as limiting in any way the remainder of the disclosure.

Example 1: Compound Synthesis

Materials and Methods

All chemicals were used as received unless otherwise noted. Graphite flakes (+100 mesh) was obtained from Sigma Aldrich, carbon nanotubes (CNT) was purchased from Carbon Nanotechnologies. Hydrogen peroxide (35% w/w, BDH7814-3) and benzoic acid were purchased from VWR. Pyrrole, $ZrCl_4$ and N,N-dimethylformamide (DMF) were obtained from Alpha Aesar. The reference complex, CuTCPP, (where TCPP=tetrakis(4-carboxypheny)porphyrin), were synthesized according to published procedures (Feng, et al., 2012, Ang Chem Int Ed, 51:10307-10310). The microwave synthesis was performed using CEM (Discover SP). The traditional heating was using Lindberg Blue tube furnace (Model: STF55346C).

Synthesis of CuMOF

This reaction was performed on twice the scale reported in the literature (Feng et al., 2012, Angew Chem Int Ed, 51:10307-10310). $ZrCl_4$ (70 mg), CuTCPP (50 mg) and benzoic acid (2700 mg) in 8 mL of DEF were ultrasonically dissolved in a 20 mL Pyrex vial. The mixture was heated in 120° C. oven for 48 h. After cooling down to room temperature, dark red needle shaped crystals were harvested by filtration (Yield: 140 mg, 52%). The as-synthesized MOF was then subsequently soaked in acetone over the course of three days to remove most of the DEF from the pores, then filtered and dried under vacuum.

Synthesis of hG/CNT 0.9 g of sigma graphite flakes and 0.1 g of CNT was mixed in a beaker. 50 mL of 98% $H_2SO_4$ was added to the beaker. After addition of 5 mL 35 w/w % $H_2O_2$, the temperature was kept at 40° C. for 1 hour with continuous stirring and purging of oxygen. Then the obtained graphite intercalation compound (GIC)/carbon nanotube (CNT) sample was filtered and washed with DI-water until neutral and dried under vacuum. 60 mg of the GIC/CNT was heated in CEM microwave reactor for three times with setting of 200 Watts for 5 seconds each time with about 5 min in between of two microwave pulses for cooling down the sample and the reactor to room temperature. The as-prepared material was denoted as hG/CNT. Certain amount of hG/CNT was sonicated in ethanol to form a uniform suspension with a concentration of 6.5 mg/mL.

Synthesis of CuMW 10 mg of the CuMOF was mixed with 1 mL of the hG/CNT suspension (or carbon black (CB) suspension with the same concentration of 6.5 mg/mL) with 30 min bath sonication. The mixture was then dried at 98° C. for 35 min. After the dried mixture was cooled to room temperature, it was heated in the CEM microwave at 300 Watts for different durations. The details of the samples names and microwave conditions are listed in Table 1. The as-obtained samples were used as electrocatalysts without further treatment.

TABLE 1

Conditions for the microwave synthesized samples.

| Sample | Carbon | MW power/W | MW duration/s |
|---|---|---|---|
| CuMW3 s | hG/CNT | 300 | 3 |
| CuMW | hG/CNT | 300 | 5 |
| CuMW10 s | hG/CNT | 300 | 10 |
| CuMW15 s | hG/CNT | 300 | 15 |
| CuMW30 s | hG/CNT | 300 | 30 |
| CuMW-150 W | hG/CNT | 150 | 5 |
| CuMW-200 W | hG/CNT | 200 | 5 |
| CuMW-CB | Carbon black | 300 | 5 |

Synthesis of Traditionally Heated Catalysts (e.g., CuTH)

CuMOF was heated at 700° C., 1000° C., and 1100° C. for 1 hour with a ramping rate of 5° C./min in a tube furnace under protection of argon. The obtained samples were denoted as CuTH-700 (CuTH), CuTH-1000, and CuTH-1100, respectively. A sample of CuTH was leached in oxygen saturated 1 M HCl for 4 hours to remove the Cu aggregates, and this sample was denoted as CuTHa.

Example 2: X-Ray Studies

X-Ray absorption data were collected using Beamline 6BM at National Synchrotron Light Source II (NSLS-II), at Brookhaven National Labs (BNL) and at 20BM beamline at Advanced Photon Source (APS) at Argonne National Labs (ANL).

At NSLS-II, data were collected at Cu K-edge (8979 eV) in transmission mode using beamline 6BM, which utilizes a 3-pole wiggler source and an optical system consisting of a paraboloid collimating mirror, Si(111) face monochromator, a toroidal focusing mirror, and a flat harmonic rejection mirror. The monochromatized unfocused beam was generated with a 6×1 mm spot size. Ionization chambers filled with 100% $N_2$ gas were used to measure incident ($I_0$), transmitted ($I_t$), and reference ($I_r$) intensities. Cu foil was used as a reference for energy calibration. The thoroughly ground, undiluted powder samples were packed in Kapton tape-covered 0.25 mm thick sample holder cards. All data were collected at room temperature; 3 spectra were collected and averaged for each sample, with 15-minute acquisition time for each spectrum. To test sample susceptibility to X-ray damage, scan-to-scan comparisons revealed negligible changes between sequential spectra measured at a given sample spot.

At APS 20-BM, data were collected at Cu K-edge (8979 eV) in both, fluorescence and transmission mode. The beamline optical system consists of fixed-exit double-crystal Si(111) monochromator, a toroidal focusing mirror and variable-angle harmonic rejection mirror. The monochromatized focused beam was generated with a 0.5×0.5 mm spot size. Ionization chambers filled with 100% $N_2$ gas were used to measure incident ($I_0$), transmitted ($I_t$), and reference ($I_r$) intensities. Cu foil was used as a reference for energy calibration. Fluorescence spectra were collected using Ge solid state fluorescence detector. The thoroughly ground, undiluted powder samples were packing in Kapton tape-covered 0.25 mm thick sample holder cards. All data were collected at room temperature; 5 spectra were collected and averaged for each sample, with 7-minute acquisition for each spectrum. Scan-to-scan comparisons revealed negligible changes between sequential spectra measured at a given sample spot, indicating no significant X-ray damage.

Figure 1B:
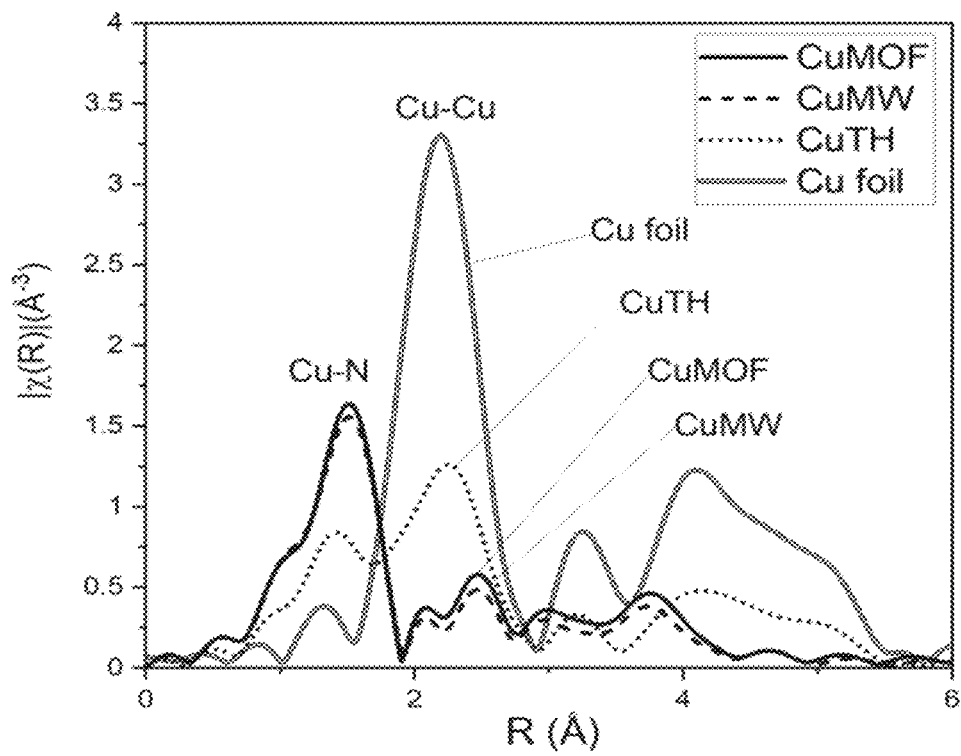

Several electrocatalysts, prepared as described herein, have been characterized by Cu K-edge X-ray absorption spectroscopy, which provides element specific electronic and local structural information about the Cu sites within these materials. X-ray near-edge spectroscopy (XANES) and extended X-ray absorption fine structure (EXAFS) data for the samples achieved via microwave heating are presented herein (FIGS. 1A-1B). Comparison with several reference systems, including metallic Cu, copper oxides and the CuMOF precursor, suggests that upon microwave treatment, the Cu sites maintained similar speciation as in the porphyritic structures of the parent MOF material (CuMOF). The XANES edge energy indicates a $Cu^{2+}$ oxidation state and the 1s→4p "shakedown" feature at 8986.3 eV indicates that the square planar structure of Cu—$N_4$ in the Cu-porphyrin is largely preserved (FIG. 1A). The EXAFS spectra of the CuMW sample lack the characteristic Cu—Cu peak observed for metallic species, demonstrating that microwave heating can effectively avoid metal aggregation and all of the Cu atoms remain in the isolated forms (FIG. 1B).

Figure 2A:
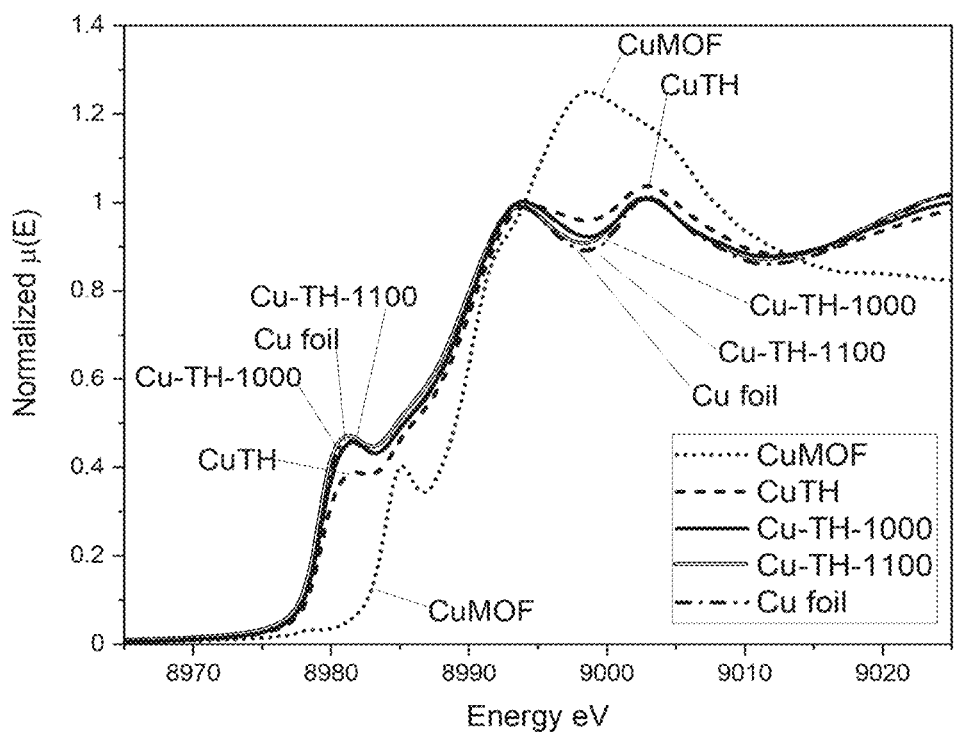
FIGS. 2A-2B provide XANES and EXAFS spectra of several materials, providing electronic and structural data about the Cu sites within the materials, demonstrating metallic aggregates with SACs prepared by traditional heating even with temperatures as low as 700° C.
Figure 2B:
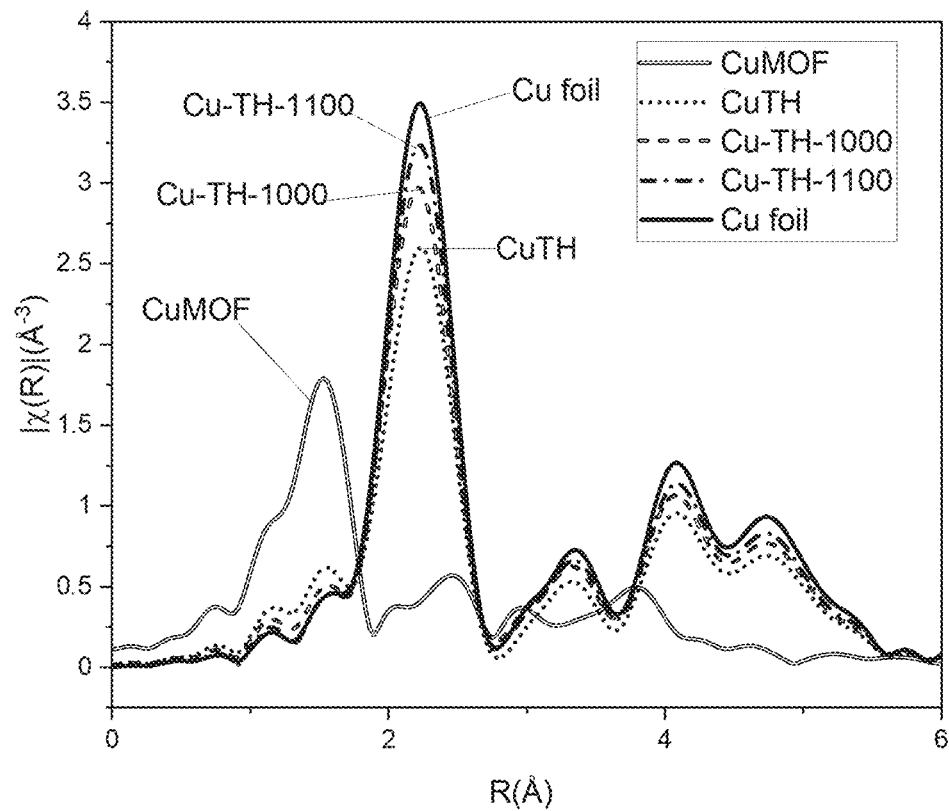

In contrast, the porphyritic structures were largely destroyed in the samples produced via traditional heating as evident in (FIGS. 2A-2B), with complete destruction evident at the most elevated temperatures of up to 1100° C. The XANES spectra For CuTH reveal an edge shift indicating a large presence of $C^0$ species (FIG. 2A). Furthermore, the EXAFS spectra clearly contain a Cu—Cu scattering peak (FIG. 2B). The XAS spectra provide strong evidence for substantial metal aggregation, even at the milder pyrolysis at 700° C. Note this temperature was 100° C. lower than that used for PCN222-Fe in the literature (Jiao et al., 2018, Angew Chem Int Ed, 139:14143-14149).

Figure 3A:
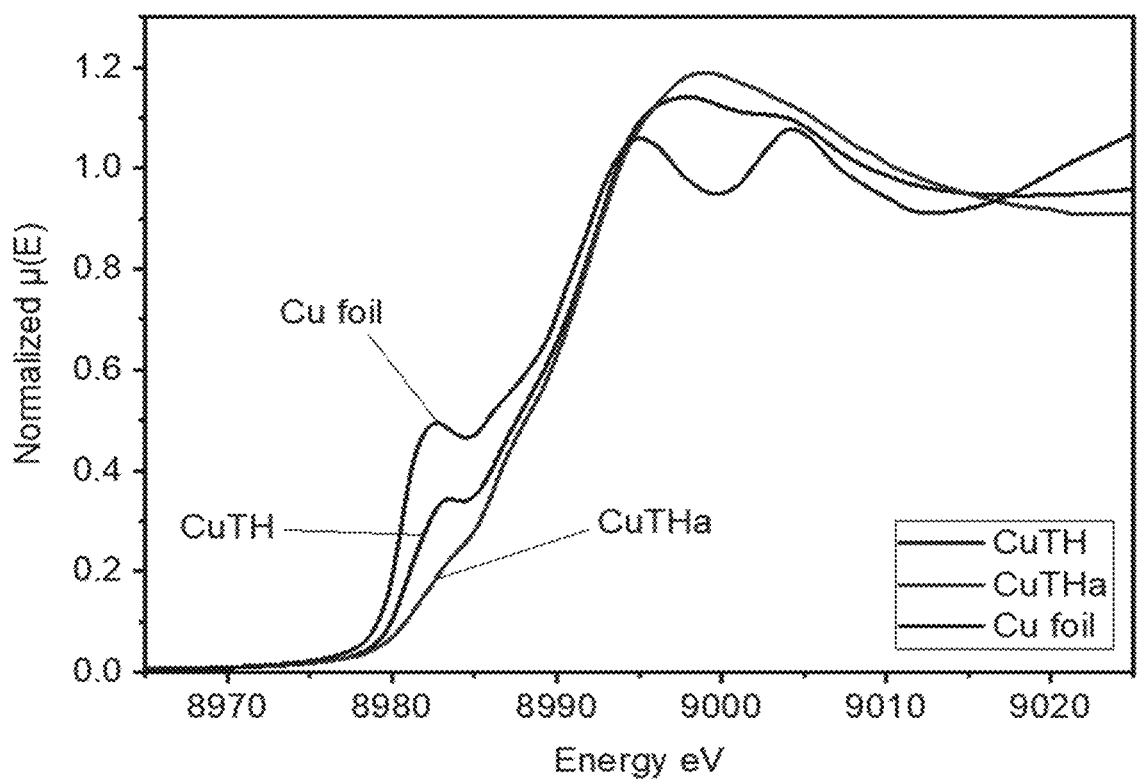
FIGS. 3A-3B provide XANES and EXAFS spectra of several materials, providing electronic and structural data about the Cu sites within the materials, demonstrating metallic aggregates with SACs prepared by traditional heating that can be removed by acidic post treatment.
Figure 3B:
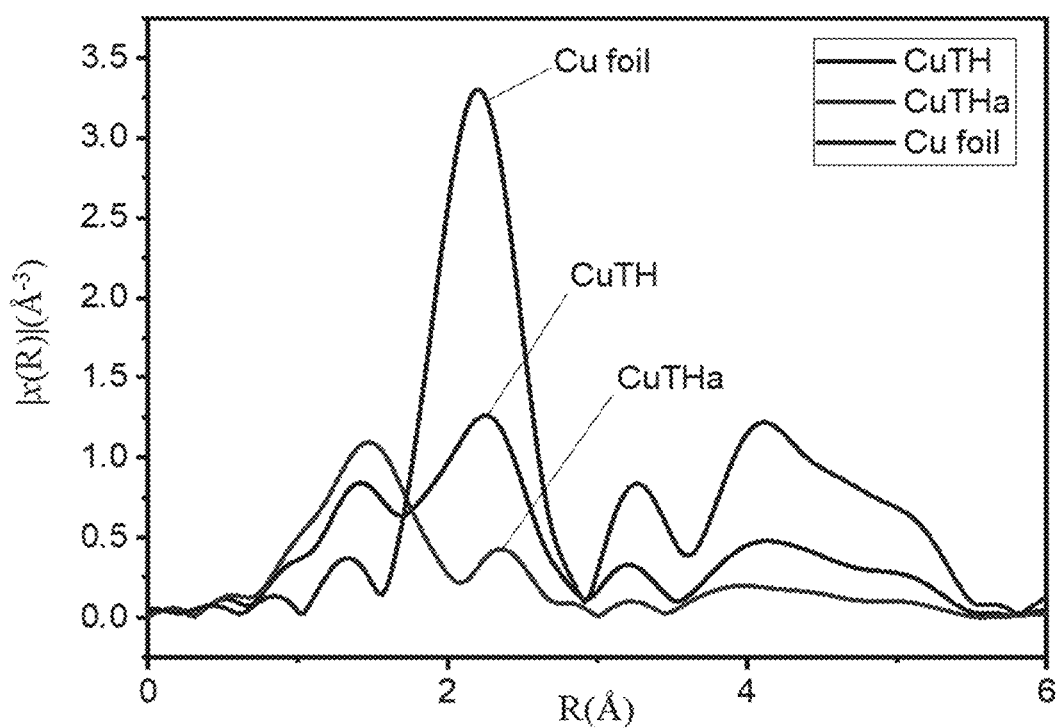

Preparation of CuTH followed by acidic post-treatment afforded CuTHa. The resulting CuTHa has a Cu—$N_4$ structure similar to that of CuMW, demonstrated by the X-ray fine structure spectroscopy studies (FIG. 3A). Furthermore, the Cu aggregates were removed by acid post-treatment, as evidenced by the EXAFS spectrum of CuTHa (FIG. 3B).

Example 3: High-Angle Annular Dark-Field Scanning Transmission Electron Microscopy (HAADF-STEM) and Electron Energy Loss Spectroscopy (EELS)

HAADF-STEM and EELS data was acquired from a Nion UltraSTEM 100 operating at 60 kV. The probe convergence and HAADF collection cut off half angle was 30 and 80 mrad, respectively. For high spatial resolution imaging, beam current was about 15 pA. Spherical aberration was corrected so that the beam size around 1 Angstrom. To identify the single atoms observed during high resolution imaging, EELS spectra were acquired with a maximum current probe setting. Cu atoms are very mobile under electron beam irradiation. Therefore, EELS spectra were measured while the beam was scanning an 8×8 nm area as this allows a higher chance for the fast electrons to encounter Cu single atoms. The spectrometer dispersion was about 0.8 eV/channel and the EELS detector exposure time was 5 seconds/frame.

STEM and EELS were applied to study the microwave pyrolyzed samples and further confirm the single-atom dispersion and uniformity of catalytic sites (FIGS. 4A-4E). Compared to the XAS techniques, STEM and EELS are more surface sensitive, and their high spatial resolution permits the study of the change of both the MOF particles and the carbon nanomaterials upon microwave irradiation.

Figure 4A:
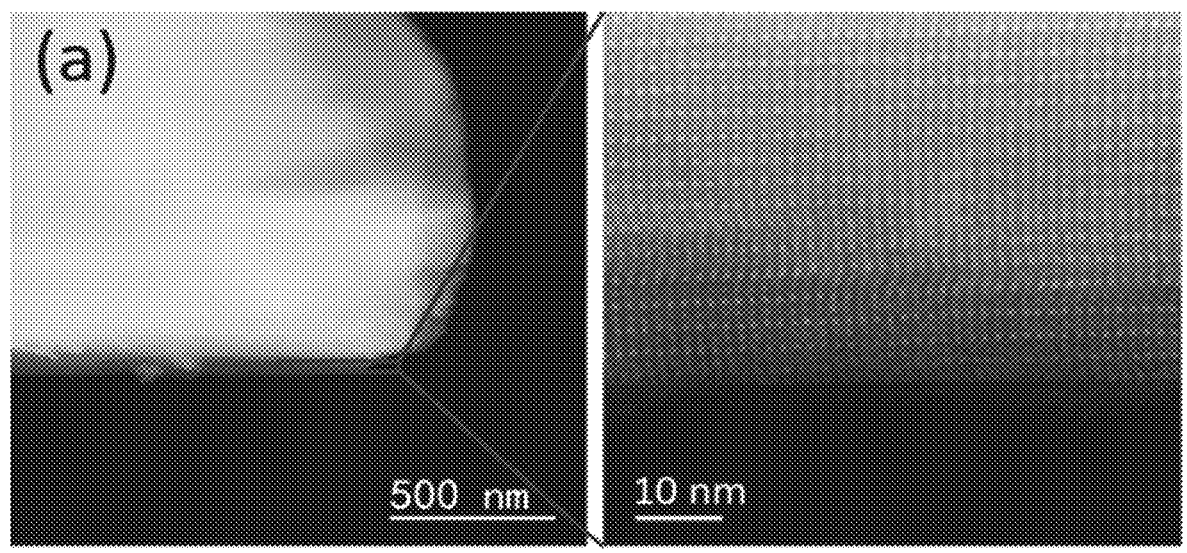
FIGS. 4A-4C provide HAADF images of various materials before and after microwave irradiation, which taken together demonstrate the transfer of Cu atoms from CuMOF to the holey graphene upon microwave irradiation.
Figure 4B:
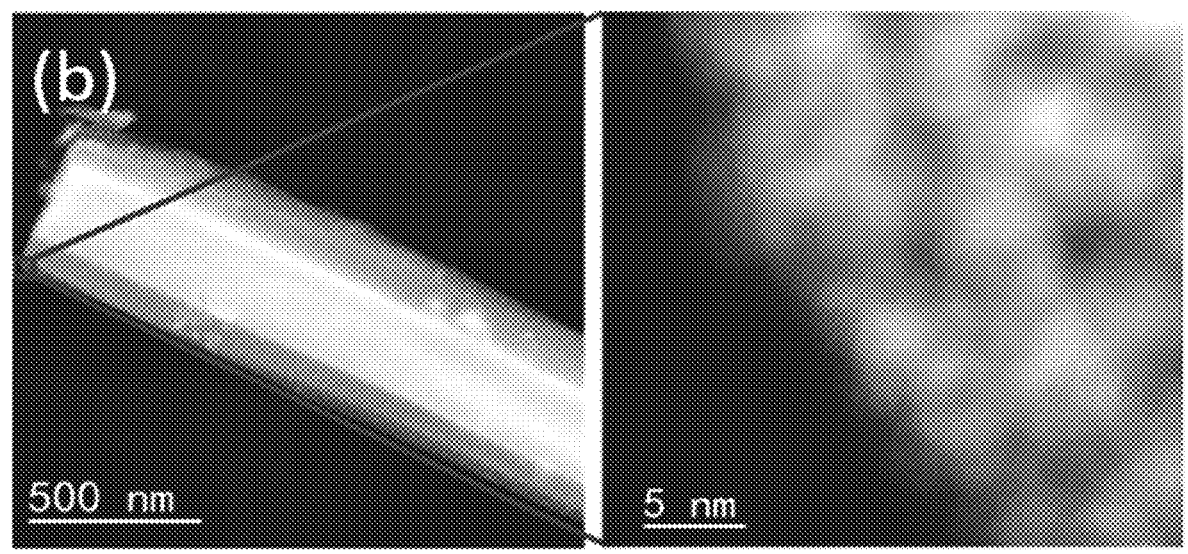
Figure 4C:
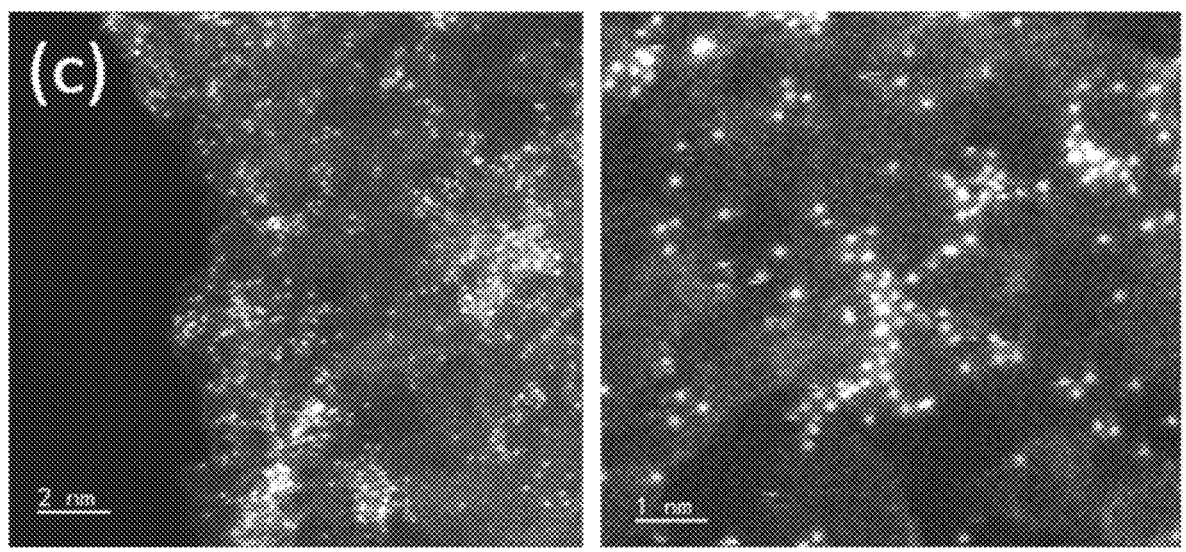
Figure 4D:
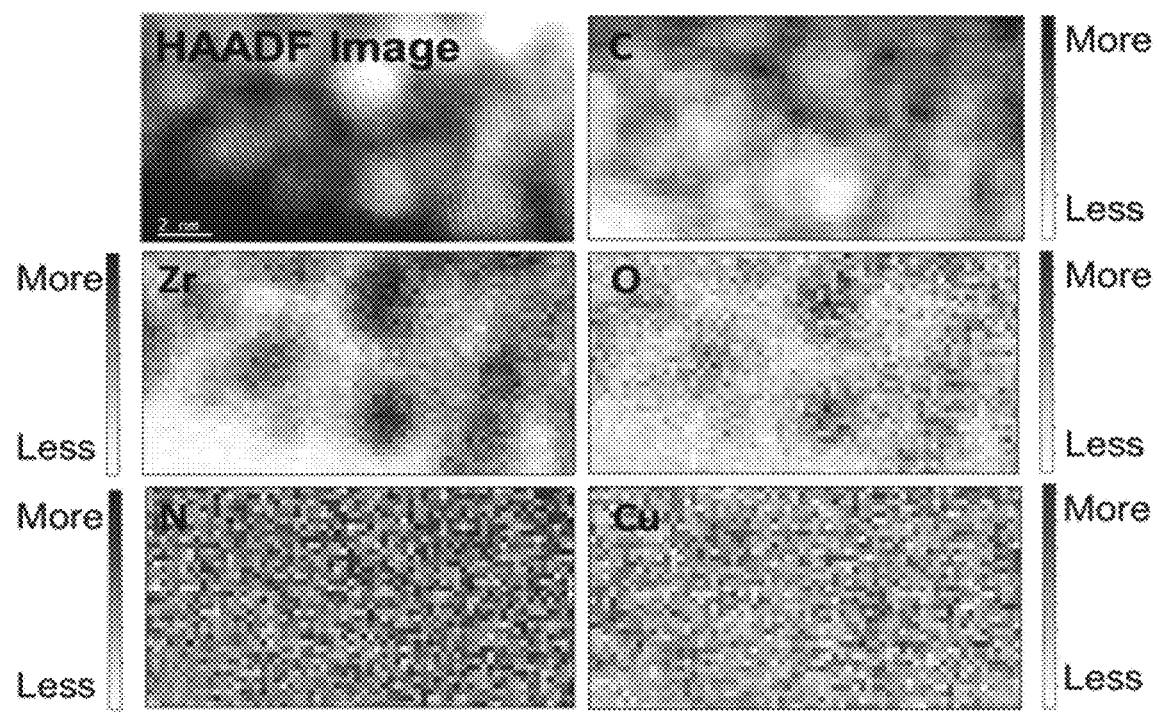
FIG. 4D provides an electron energy loss spectroscopic (EELS) mapping of the MOF part of CuMW, clearly demonstrating that the surface of the MOF was transferred to a composite layer, comprising a layer of zirconium oxide nanoparticles dispersed in a carbon matrix with non-detectable N and Cu.
Figure 4E:
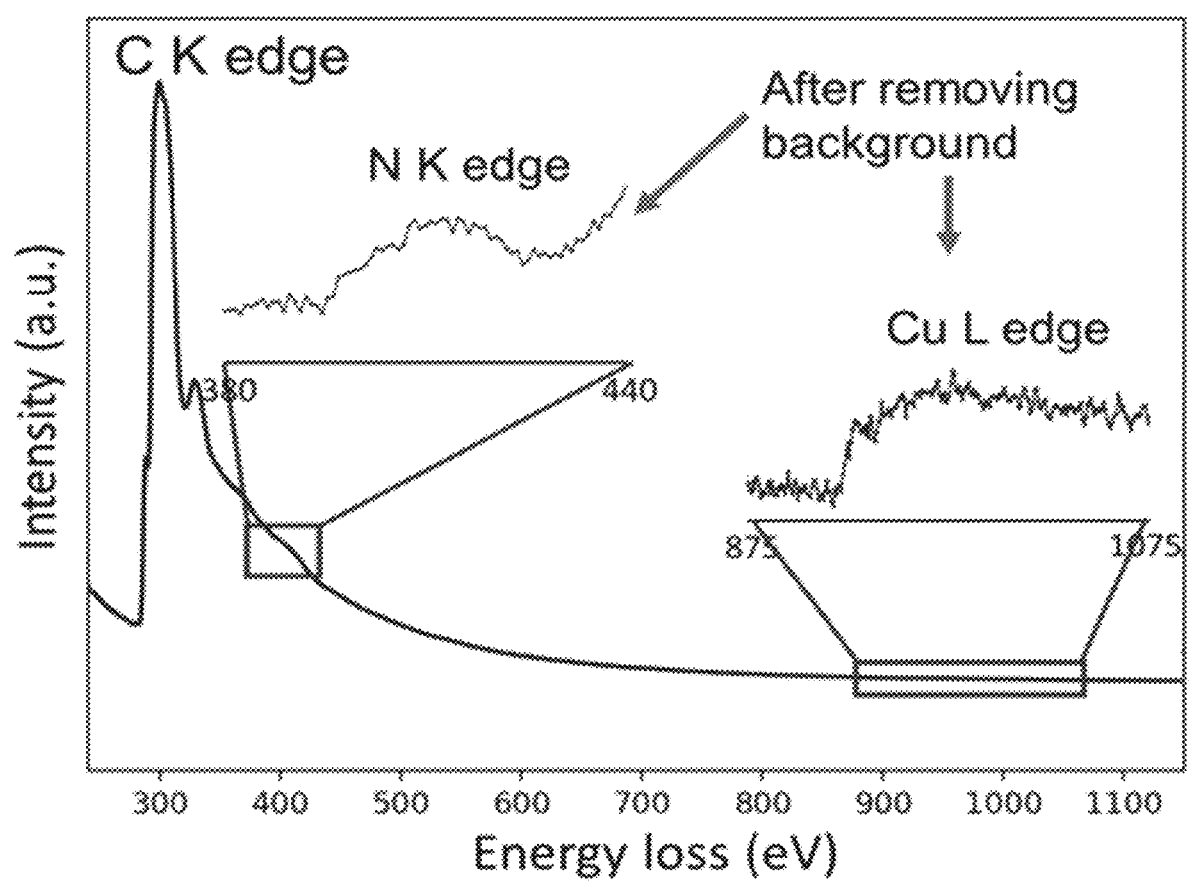
FIG. 4E provides a graph that represents an averaged EELS mapping from an 8×8 $nm^2$ section of the holey graphene part of CuMW showing a 1:4 ratio of Cu to N is present and indicating that the holey graphene acted as not only a microwave absorber, but also a substrate into which the metal atoms are incorporated.

The HAADF image of the CuMOF crystal before pyrolysis demonstrates the periodically arranged high intensity white dots representing Zr-oxo node clusters (FIG. 4A). It is important to note that the low atomic mass of Cu compared to Zr increases the difficulty of Cu identification in the material during HAADF imaging. Upon a short microwave pyrolysis, the original periodical arrangement of these clusters disappeared and changed to densely packed nanoparticles of 2-3 nm (FIG. 4B). Core loss EELS mapping clearly demonstrated that these nanoparticles are zirconium oxide, which are dispersed in the carbon matrix derived from the organic part of the MOF crystal (FIG. 4D). A negligible amount of nitrogen and copper were detected in the mapped area of the pyrolyzed MOF, indicating that no copper aggregates nor oxides were formed upon microwave irradiation, as the detection of aggregated Cu particles is relatively easy compared to single Cu atoms (FIG. 4B). A number of single dispersed metal atoms were located on the holey graphene sheets used as a microwave absorbing species after microwave irradiation by HAADF imaging (FIG. 4C). These single dispersed metal atoms are identified as Cu, which are coordinated by N with a Cu to N ratio around 1:4 by EELS (FIG. 4E). These results suggest that the holey graphene was acting not only as a microwave absorbing species, but also as a substrate into which the single metal atoms were incorporated.

Example 4: Raman Spectroscopy

Raman spectra of the catalysts were collected using a Confocal Raman Microscope (WITec Alpha 300R Plus) with an excitation laser at 532 nm.

Figure 5A:
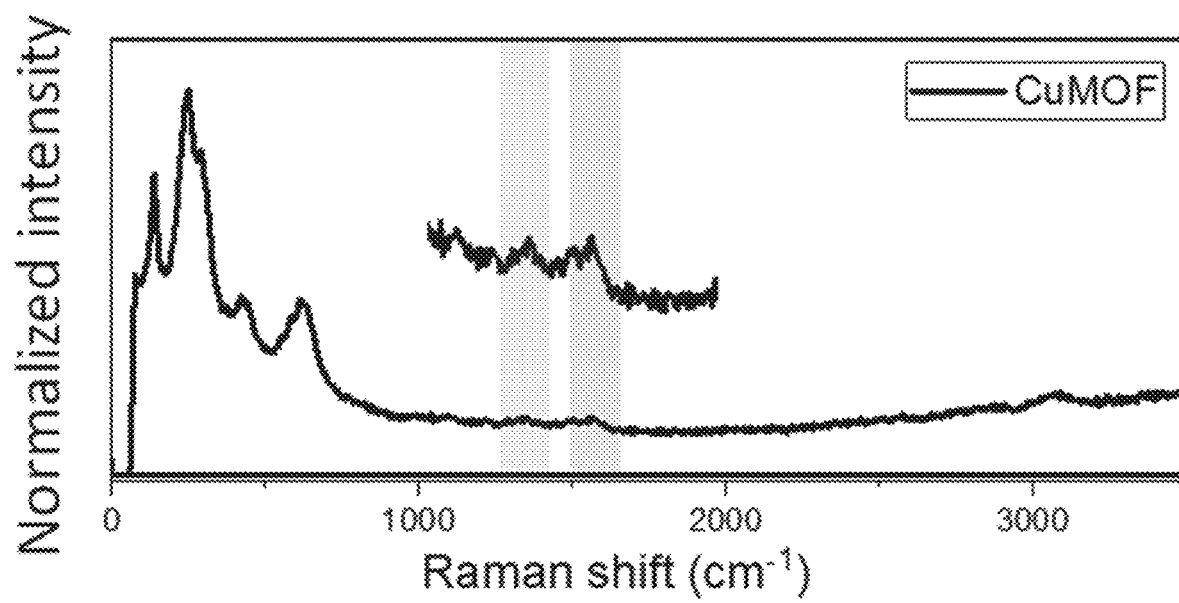
FIGS. 5A-5D provide Raman spectroscopic data of several materials.
Figure 5B:
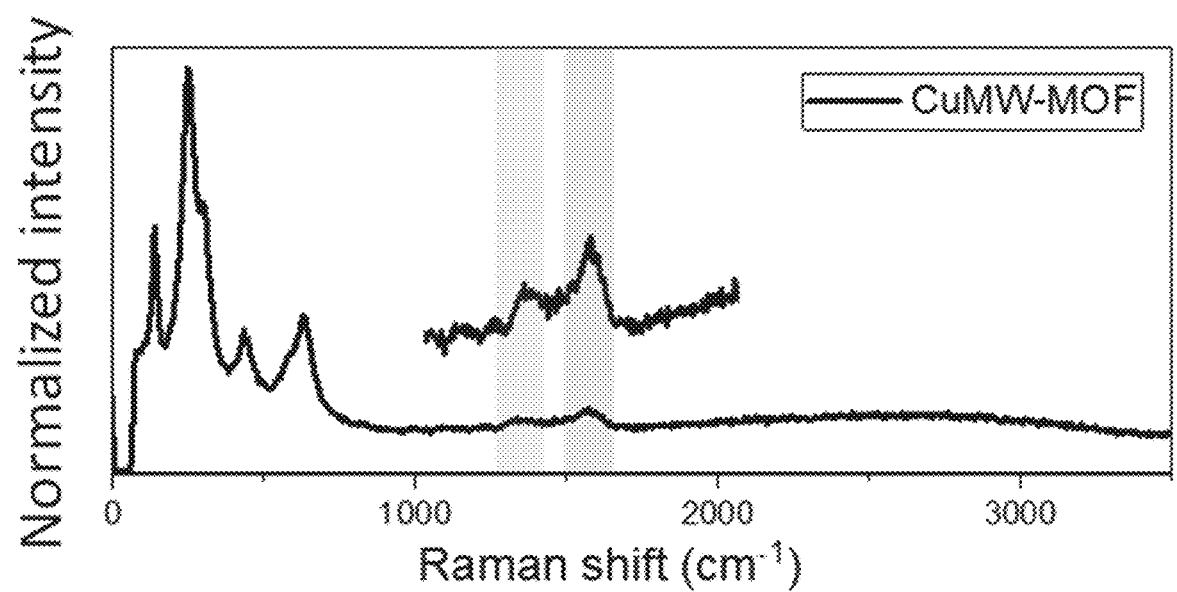
Figure 5C:
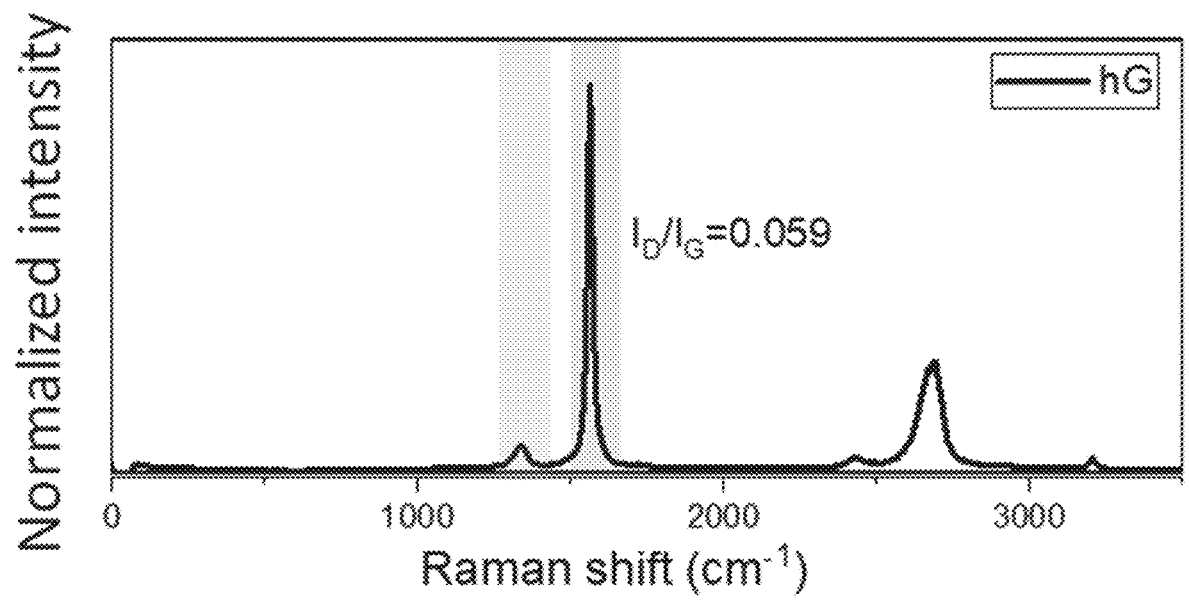
Figure 5D:
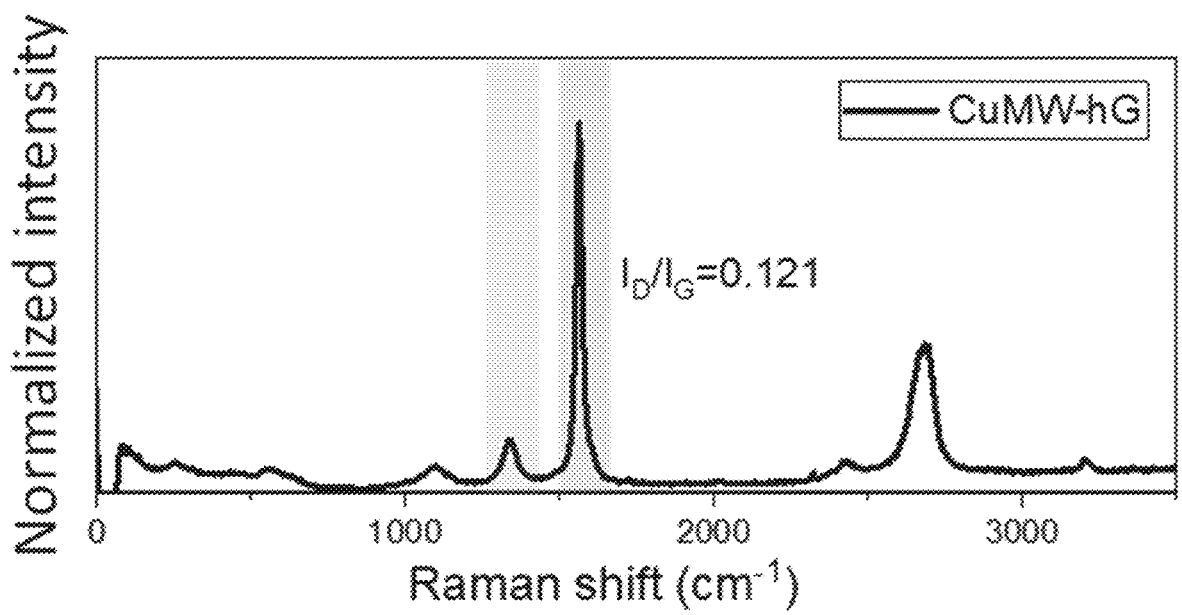

Raman spectra of MOF particles before and after microwave irradiation demonstrate that the level of graphitization of the organic linkers in the MOF is very low, as indicated by the similar low intensity and less defined peak shapes of the G and D bands (FIGS. 5A-5B). In high contrast, the G band of the holey graphene remains well defined with high intensity, the intensity ratio of D to G bands just slightly increased from 0.059 to 0.121, possibly aroused from the incorporation of Cu—$N_4$ into their basal planes (FIGS. 5C-5D). The low D/G band ratio suggesting that the hG where the Cu—$N_4$ sites are incorporated has much larger defect-free graphene domains. This feature is wholly different from previous reported PGM-free SACs including Fe-, Cr-, Mn-, Cu-based SACs. These Cu—$N_4$ sites on holey graphene sheets are not only easily accessible, but the electron transfer rate on the graphene is also much faster than those of amorphous carbon in general.

Example 5: Electrochemical Studies

Working Electrode Preparation

To prepare the ink, 5 mg of a selected catalyst was added in 1.4 mL of DI-water and 0.1 mL of 5% w/w Nafion dispersion. The mixture was sonicated until a uniform ink was formed. 15 μL of the ink was dropped on the disk electrode of the RRDE and dry under vacuum to form a film with catalyst loading of 398 μg/cm$^2$ which is used as the working electrode.

Electrochemical Measurements

The electrochemical oxygen reduction reaction (ORR) was performed in a 3-electrode system with a RRDE as the working electrode, on which the catalyst film was deposited only on the disk electrode, Ag/AgCl (0.1M KCl) and graphite rod as the reference electrode and counter electrode, respectively. A 0.1 M KOH electrolyte was prepared using KOH pellet and standardized using potassium hydrogen phthalate as the primary standard. 0.1 M $HClO_4$ was standardized using the standardized 0.1 M KOH. A general procedure to evaluate the ORR performance is as follows: Argon was purged continuously throughout the measurement in Ar saturated electrolytes to maintain an oxygen-free environment. Before any measurement, Ar was purged for 30 minutes to fully remove the dissolved oxygen in the electrolyte and cyclic voltammetry was performed at 0.1 V/s for 20 times to activate the electrode before the measurement. Cyclic voltammetry at 10 mV/s without rotation and linear sweep voltammetry at 10 mV/s with rotation speed of 400, 900, 1600, and 2500 rpm were recorded in both oxygen and argon saturated electrolytes. For oxygen saturated electrolytes, oxygen was purged continuously throughout the experiment. Due to the low solubility of $O_2$ in aqueous solution and the fast consumption of $O_2$ during the ORR, waiting in between two ORR measurements was needed to ensure that the electrolyte was saturated with $O_2$ for each ORR measurement. Two minutes of oxygen bubbling with rotation was determined to be enough to saturate the electrolyte. Electrochemical impedance measurement was carried out in oxygen saturated electrolyte at an overpotential of 200 mV. The collection efficiency (Nc) of each catalyst film was measured via chronoamperometry technique in 5 mM $K_3Fe(CN)_6$ in 0.1 M KCl solution and was used to calculate the electron transfer number n (see detail in the data processing section).

For the hydrogen peroxide reduction reaction (HPR), Ar gas was purged continuously into the electrolyte containing 2 mM $H_2O_2$ throughout the experiment. Linear sweep voltammetry was performed at 0.01 V/s with 400, 900, 1600, and 2500 rpm. An extra LSV with 400 rpm was recorded at last and was compared with the first LSV with same rotation speed to ensure that the concentration of $H_2O_2$ was not largely decreased during the electroreduction. For the study of the influence of $K^+$ concentration on the ORR, linear sweep voltammetry was recorded at scan rate of 0.01V/s with 1600 rpm with continuous oxygen purging into the electrolyte. A certain amount of $KNO_3$ salt was added to the electrolyte (30 mL) to control the concentration of potassium ion.

Data Processing

The potential was converted from vs. Ag/AgCl (0.1M KCl) to vs. RHE using the eq.1.

$$E_{RHE}=E_{Ag/AgCl}+0.222+0.059 \times pH \qquad \text{Eq. 1}$$

The LSV curves for ORR were obtained using the data collected in argon saturated electrolyte was subtracted from the data collected from oxygen saturated electrolyte. The disk current was normalized to the geometric current density. The ring current throughout the entire scanned potential range was shown after the ring signal was subtracted the ring background current measured at potentials higher than the reaction onset.

The electron transfer number n was calculated using the RRDE method was using Eq.2.

$$n = \frac{4 \times i_d}{i_d - i_r/N_C} \qquad \text{Eq. 2}$$

where $i_d$ is the disk current, $i_r$ is the ring current, $N_C$ is the collection efficiency.

The $N_C$ was calibrated using a 5 mM $K_3Fe(CN)_6$ in 0.1 M KCl solution using chronoamperometry. The amperometric i-t measurement was performed at different rotation speed with the disk potential and ring potential set at 0.1 V and 1.5 V, respectively. The i-t curves were collected for 60 seconds at each rotation speed (400, 900, 1600, and 2500 rpm). The same measurement was repeated with the disk electrode disconnected. The data of the last 10 seconds were averaged and used in calculating the Nc for each rotation speed using eq.3.

$$N_C = \frac{I_r - I_{r0}}{I_d} \quad \text{Eq. 3}$$

where $I_d$ is the averaged disk current of the last 10 seconds, $I_r$ is the averaged ring current of the last 10 seconds with the disk electrode connected, $I_{r0}$ is the averaged ring current of the last 10 seconds with the disk electrode disconnected.

Electrochemical Studies

Figure 6:
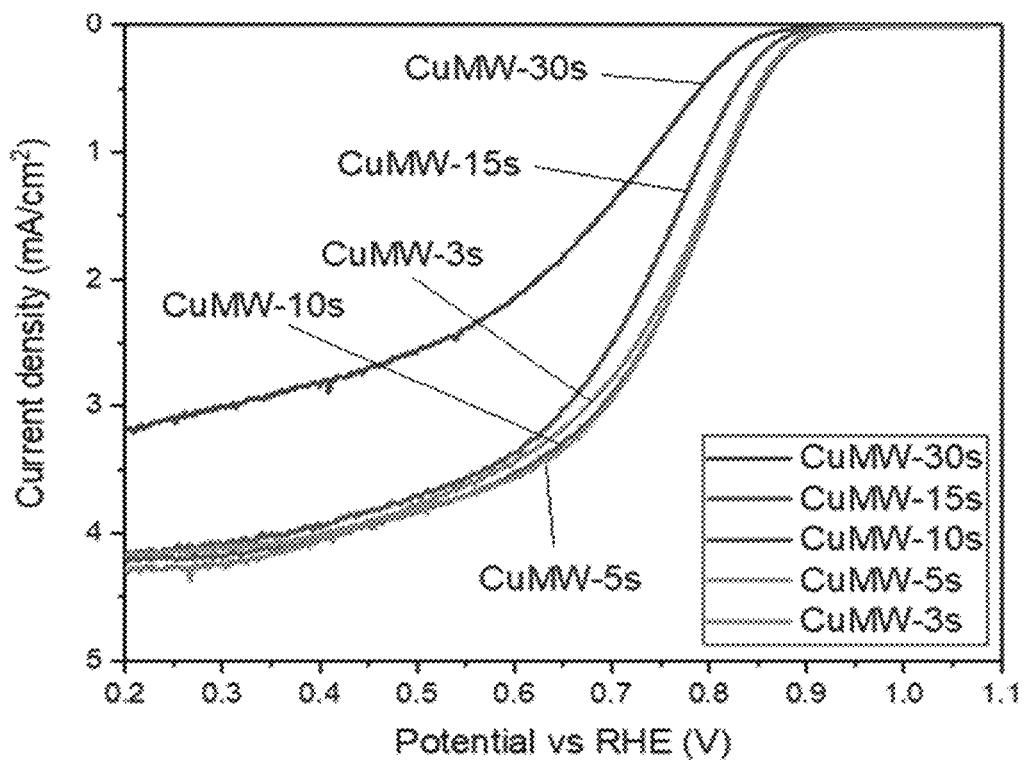
FIG. 6 provides ORR activity of catalysts prepared with holey graphene/carbon nanotube (hG/CNT) as the microwave absorber with a constant power of 300 W with various durations from 3 s to 30 s, demonstrating that catalysts fabricated with microwave durations longer or shorter than 5 seconds exhibited lower current density in the kinetic controlled region.

Catalysts prepared with different durations of microwave irradiation in the range of 3 to 30 s, while keeping all of the other aforementioned microwave irradiation conditions constant, were evaluated with regard to ORR activity under basic conditions. The catalysts fabricated with a microwave irradiation duration longer or shorter than 5 s exhibited lower current density in the kinetic controlled region (FIG. 6).

Figure 7:
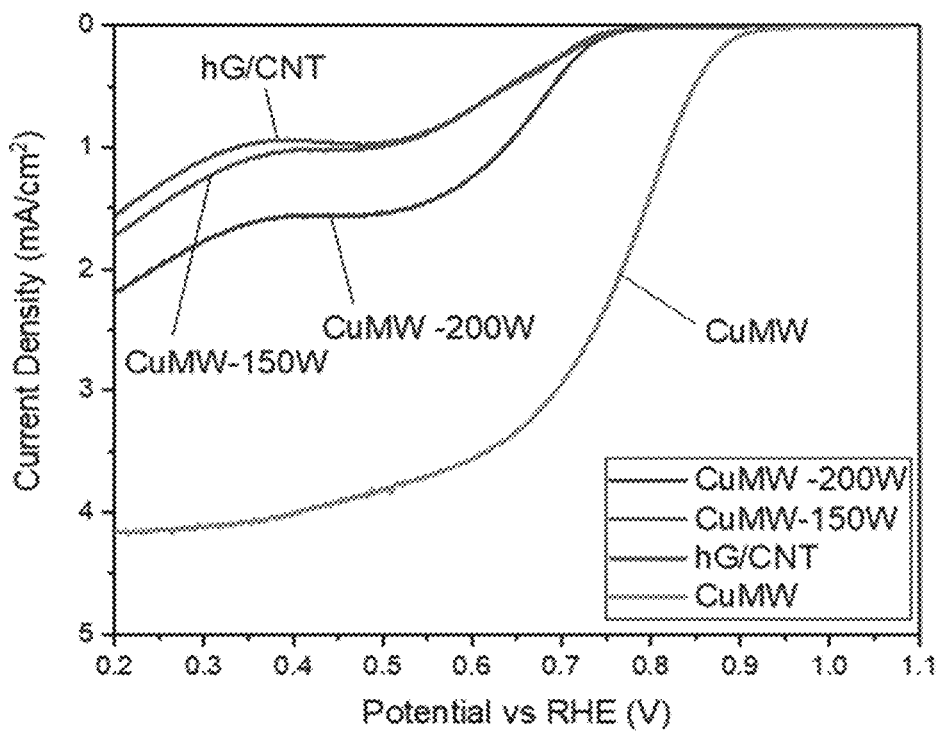
FIG. 7 provides ORR activity of catalysts prepared with holey graphene/carbon nanotube (hG/CNT) as the microwave absorber with microwave irradiation duration of 5 s, with microwave power from 150 W to 300 W, demonstrating that the catalyst fabricated with a microwave power of 300 W shows excellent performance with regard to onset potential and current density.

Using 5 s as the optimized microwave irradiation duration, the microwave power was also optimized. Catalysts prepared with different microwave irradiation power in the range of 150 to 300 W, while keeping all of the aforementioned microwave conditions constant, were evaluated with regard to ORR activity under basic conditions (FIG. 7). With a low microwave power of 150 W, the activity of CuMW-150W was found to be similar to that of hG/CNT, demonstrating that a low microwave power of 150 W is insufficient to generate $CuN_4$ active sites on graphene, as the uncarbonized non-conductive CuMOF is not ORR active. The sample with 300 W microwave power (CuMW) demonstrated the best ORR performance in the sense of both onset potential and current density.

Figure 8:
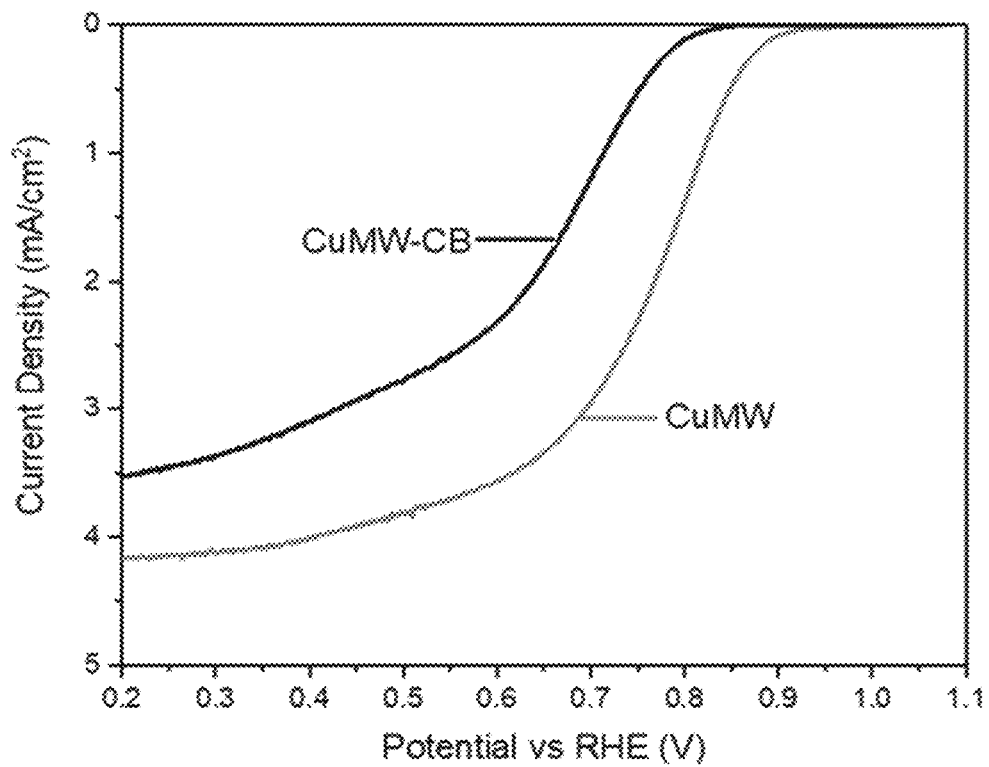
FIG. 8 provides ORR activity of catalysts prepared using carbon black (CB) and holey graphene/carbon nanotube (hG/CNT) as microwave absorbing species, demonstrating that the catalyst prepared via hG/CNT performs much better with regard to onset potential and current density.

A catalyst prepared with carbon black (CB) as the microwave absorbing species, while keeping all of the aforementioned microwave conditions constant, was compared with CuMW in regard to ORR activity under basic conditions (FIG. 8). The onset potential and current density CuMW-CB is lower than that of CuMW. This is possible because carbon black, with a much smaller graphene domain, is a less efficient microwave absorbing species, and thus does not reach as high of a temperature as hG/CNT upon microwave irradiation. Further, a $CuN_4$ active site embedded in a small graphene domain may have a lower ORR activity than a $CuN_4$ active site embedded in large graphene sheets in CuMW.

Figure 9:
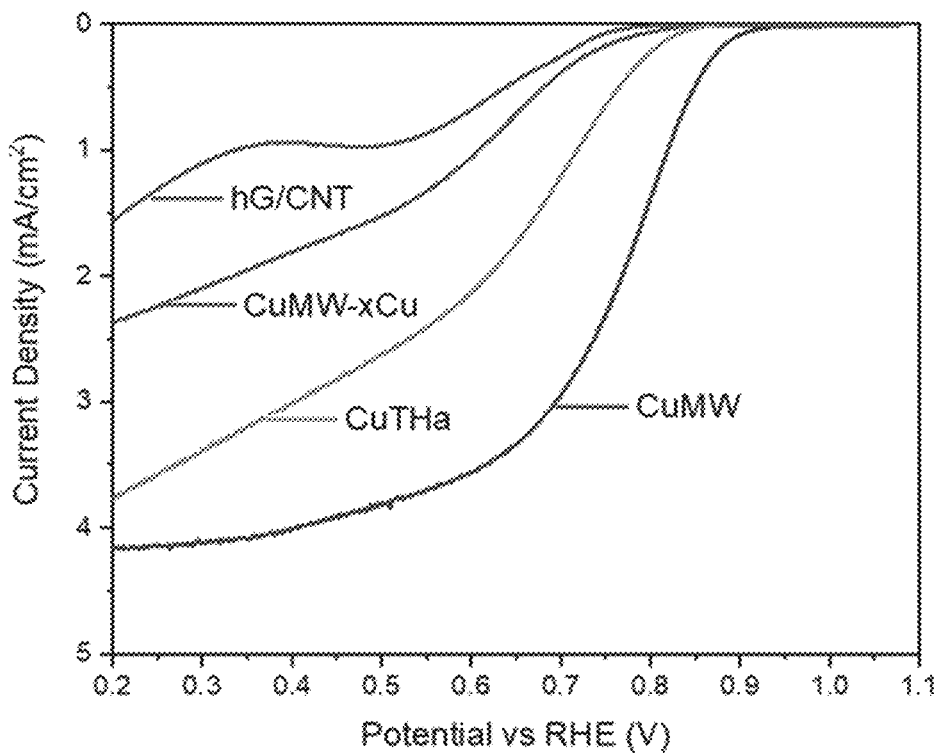
FIG. 9 provides ORR activity of various materials and demonstrates that the catalytic activity of ORR is a result of the Cu—$N_4$ active sites present in CuMW.

Pyrolysis of the equivalent of CuMOF, in which there was no Cu centers in its porphyrin structure, was performed to afford CuMW-xCu. This material (CuMW-xCu) exhibited low ORR performance, similar to the carbon nanomaterial alone without MOF (hG/CNT), demonstrating the essential role of the Cu centers in the CuMW to the observed high catalytic activity. Similarly, CuTHa, prepared by traditional heating with acid post-treatment, exhibited low ORR performance as compared to CuMW (FIG. 9).

Figure 10A:
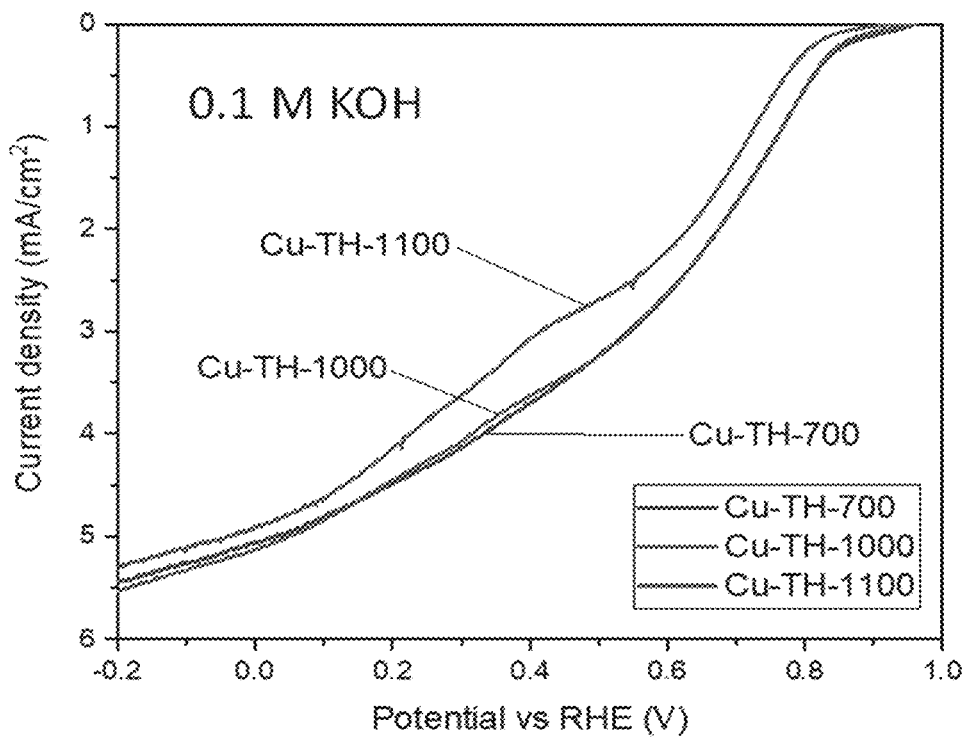
FIGS. 10A-10B provides ORR activity of several catalysts prepared by the traditional heating method in acidic and basic media, demonstrating that higher pyrolysis temperatures result in lower kinetic current density in both acidic and basic media.
Figure 10B:
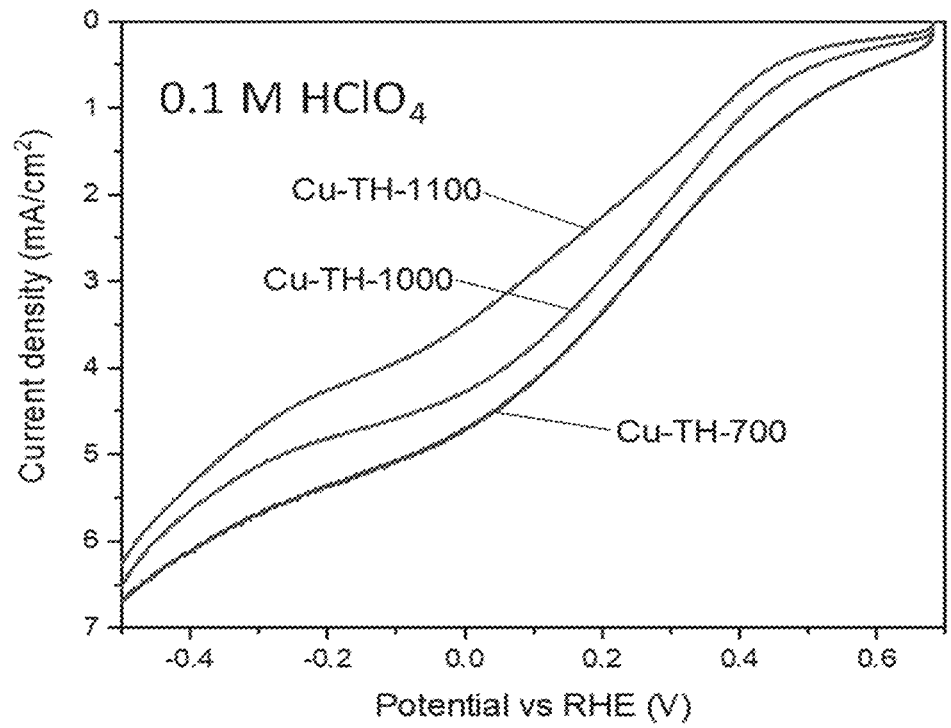
Figure 11A:
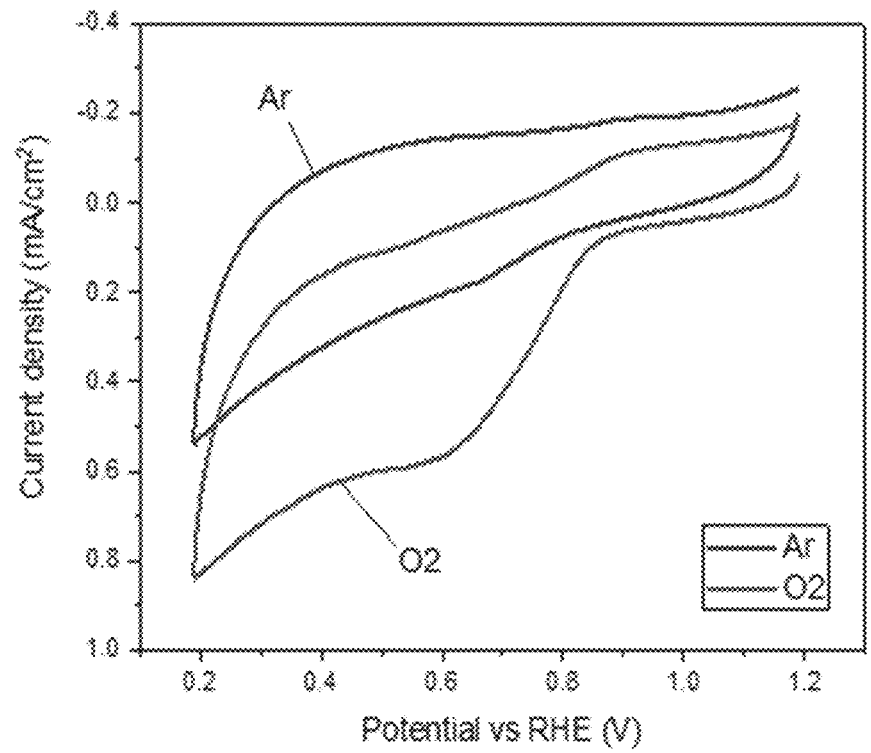
FIGS. 11A-11D provide ORR activity of CuTH and CuTHa, collectively demonstrating improved onset potential and current density of CuTHa compared to CuTH.
Figure 11B:
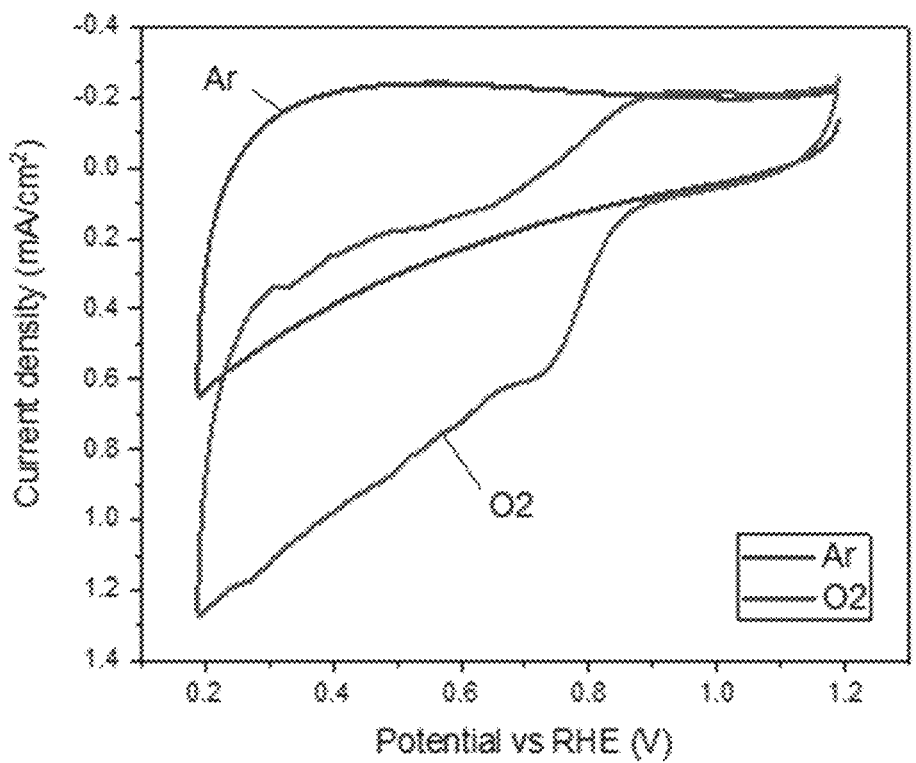
Figure 11C:
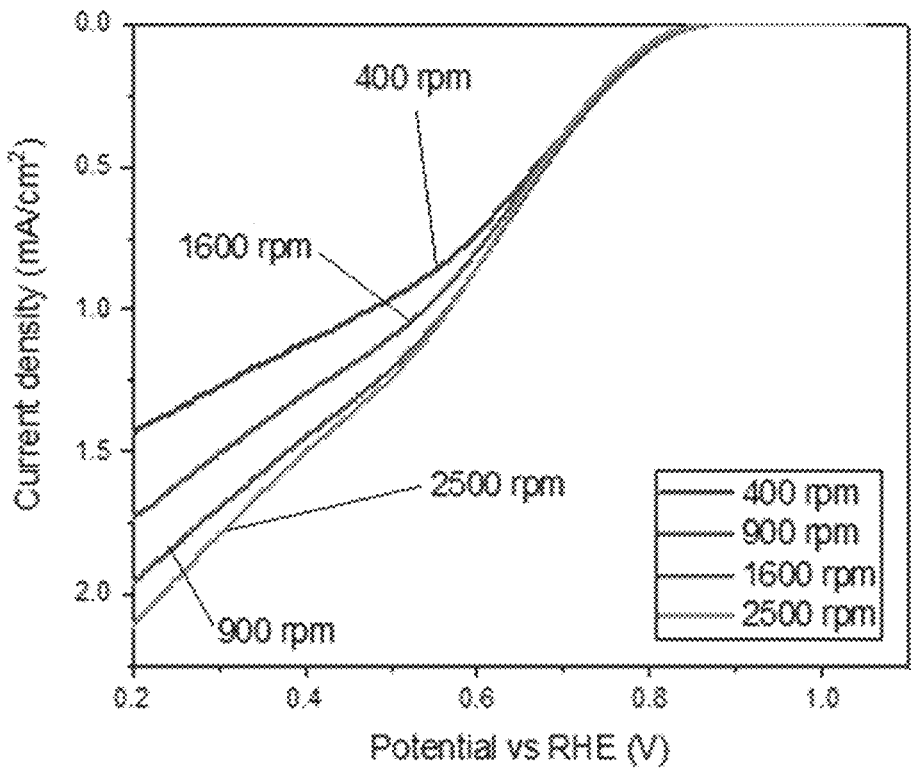
Figure 11D:
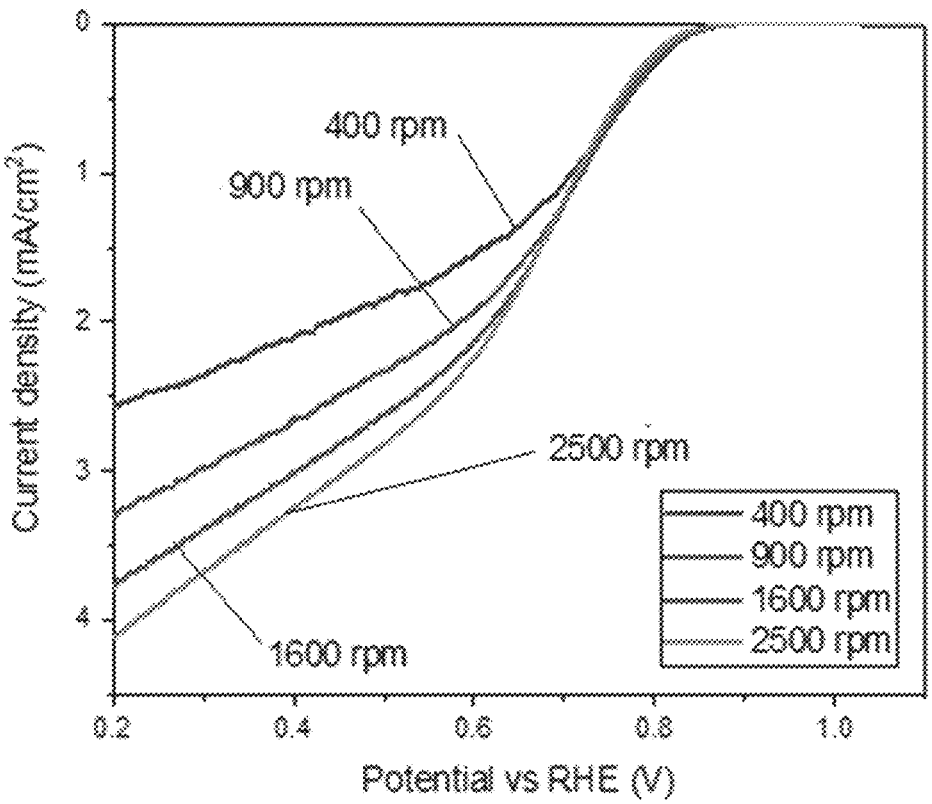

The ORR activity of catalysts prepared by the traditional heating method (CuTH, CuTH-1000, and CuTH-1100) were tested in both acidic and basic conditions and compared (FIGS. 10A-10B). Under basic conditions, CuTH-700 (CuTH) and CuTH-1000 have about the same onset potential and current, while the onset potential and current of CuTH-1100 is slightly lower (FIG. 10A). Under acidic conditions, CuTH exhibits the most positive onset potential and highest current among the traditional method prepared samples (FIG. 10B).

After acid treatment of CuTH, a catalyst denoted as CuTHa is achieved. Despite sharing a similar $Cu-N_4$ structure with CuMW, as demonstrated by X-ray fine structure spectroscopy studies, CuTHa showed low kinetic current density and an onset potential that was also largely negatively shifted to (0.85 V vs. RHE) (FIGS. 11A-11D) compared with those in CuMW (FIGS. 12A-12D). Taken together, these results demonstrated that the microwave enabled approach is not only simple and fast, but the fabricated Cu-E SAC thusly prepared exhibits greatly improved catalytic activity compared with catalysts prepared via a traditional heating approach.

Figure 12A:
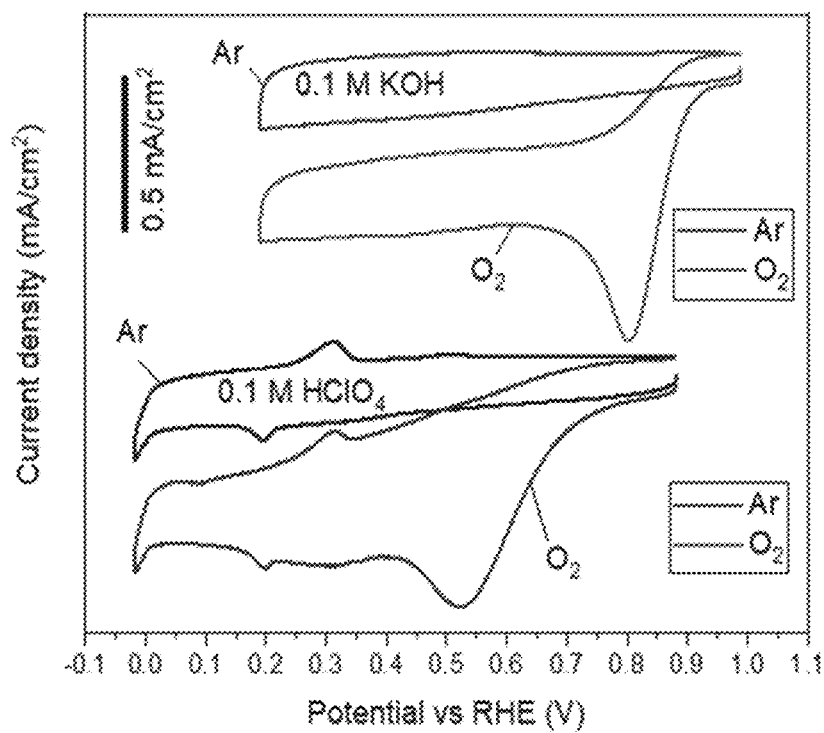
FIGS. 12A-12D shows the results of electrochemical studies of CuMW.

Cyclic voltammetry (CV) was performed for CuMW in both Ar- and $O_2$-saturated 0.1 KOH solutions. A large reduction peak was observed in the $O_2$-saturated electrolytes, while this peak was absent in the Ar-saturated solutions, suggesting that the CuMW catalyst is active in catalyzing molecular oxygen reduction (FIG. 12A). The onset ($E_{onset}$=0.92 V vs. RHE), half wave ($E_{1/2}$=0.86 V), and peak potential ($E_p$=0.8 V) are among the top performing Cu-based catalysts reported in basic media.

Figure 12B:
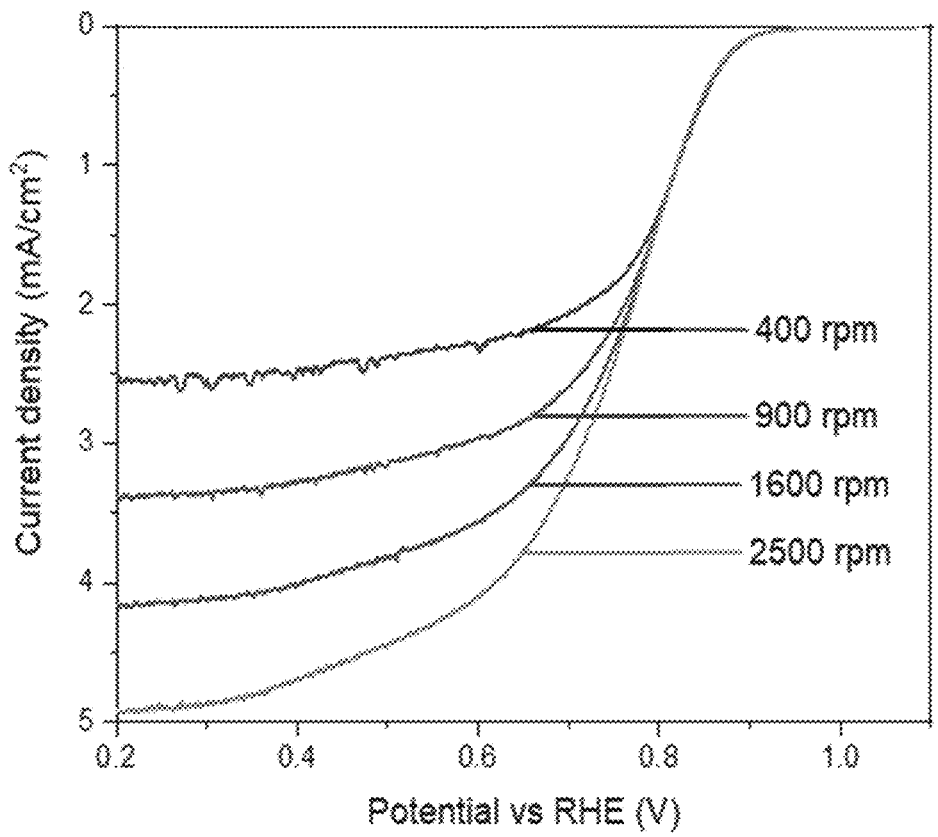

Linear sweep voltammetry (LSV) with a rotating ring-disk electrodes (RRDE) was used to study the kinetics and mechanism of the oxygen reduction reaction. The apparent electron transfer number at 0.5 V (vs. RHE) calculated from the K-L plot was about 4 (FIG. 12B).

Figure 13:
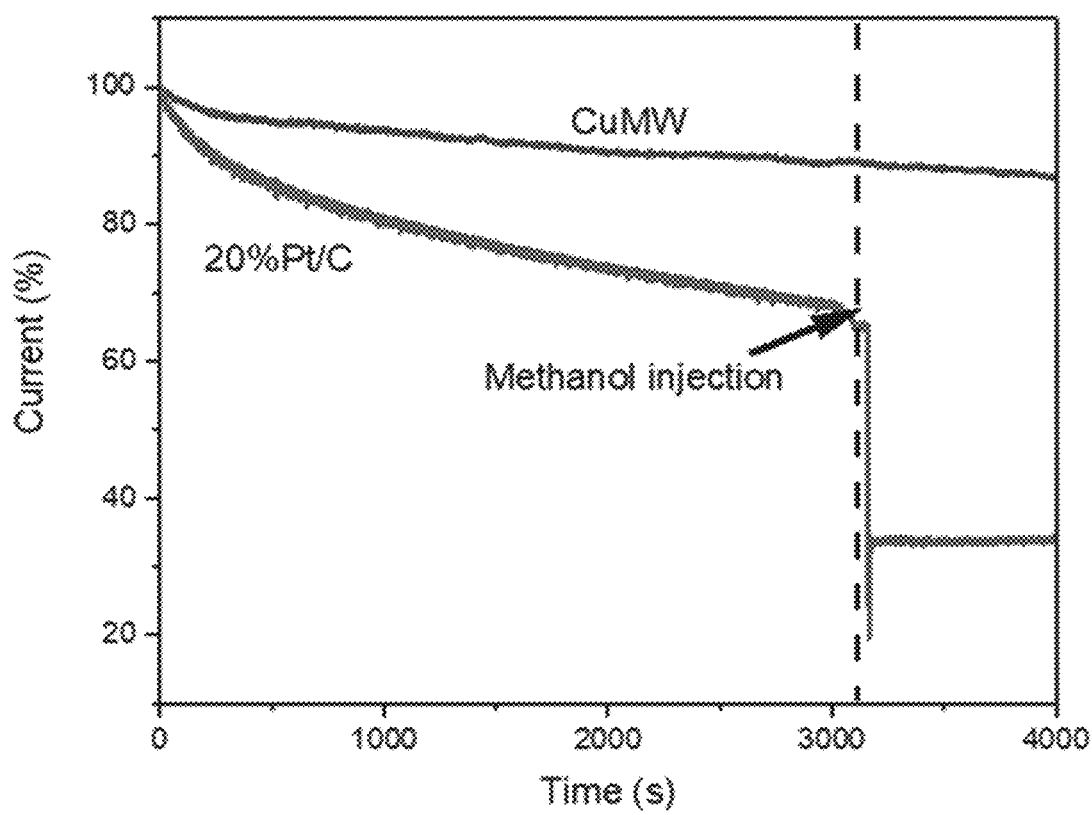
FIG. 13 shows the percentage of current as a function of time for CuMW and 20% Pt/C with the addition of methanol in the electrolyte solution, demonstrating the stability of CuMW against methanol poisoning.

Catalyst CuMW exhibits excellent long-term durability and tolerance to methanol (FIG. 13). Employing the same conditions with an alternative catalyst, 20% Pt/C, a significant decrease in percentage current was observed upon addition of methanol.

Figure 12C:
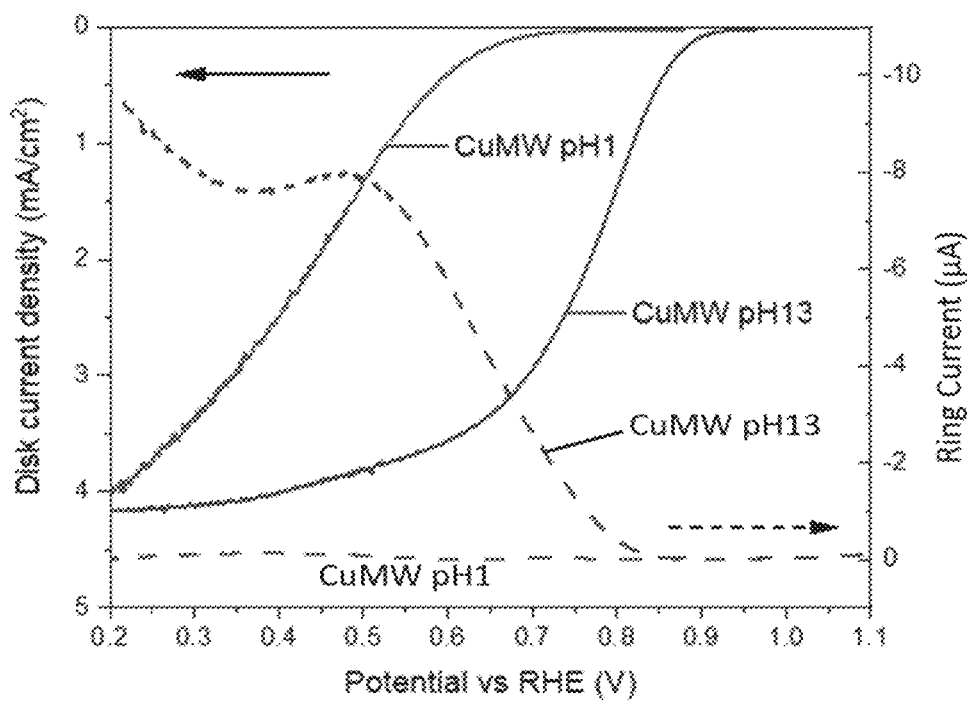

The catalytic behavior of CuMW was also studied in acidic media, which is attractive for direct application in proton-exchange membrane fuel cells. The onset potential is negatively shifted ($E_{onset}$=0.8 V), and the geometric kinetic current density is lower than that in alkaline solution (FIG. 12C). No observable diffusion-limited region was identified in 0.1M $HClO_4$, indicating kinetic control even at high overpotentials. Lower catalytic activity in acidic media, compared alkaline media, is very similar to other SACs, such as Fe and Mn, Cr, and Cu-SACs prepared by a thermal emitting method reported in the literature, which has been attributed to the lower activity of the catalytic centers in acidic than in alkaline environments in general. Pleasingly, the apparent electron transfer number (n) was found to be 4.0 at 0.5 V (vs. RHE) (FIG. 12C).

An apparent 4e pathway during electroreduction of oxygen may proceed through a direct 4e pathway ($O_2 \rightarrow H_2O$), or via indirect pathways involving a $H_2O_2$ intermediate in acidic conditions or $HO_2^-$ in basic electrolytes. By rotating the RRDE electrode, $H_2O_2$ (or $HO_2^-$ in basic media) intermediates, if generated and desorbed from the catalytic surface on the disk electrode, can be quickly spread onto the ring electrode and become immediately oxidized on the ring electrode where a constant high voltage is applied. Thus, the ring current is an indication of $H_2O_2$ (or $HO_2^-$) generation and desorption from the catalyst surface. Interaction of $H_2O_2$ with single atom based catalytic centers is much weaker than that of $HO_2^-$, thus if $H_2O_2$ intermediates were generated during ORR, they have stronger tendency to be desorbed from the catalytic center to the bulk electrolyte and to be detected at the ring electrode in acidic media. This is one of the important reasons that other transition-metal based E-SACs exhibit higher 4e selectivity in basic media compared to that in acidic media.

Figure 12D:
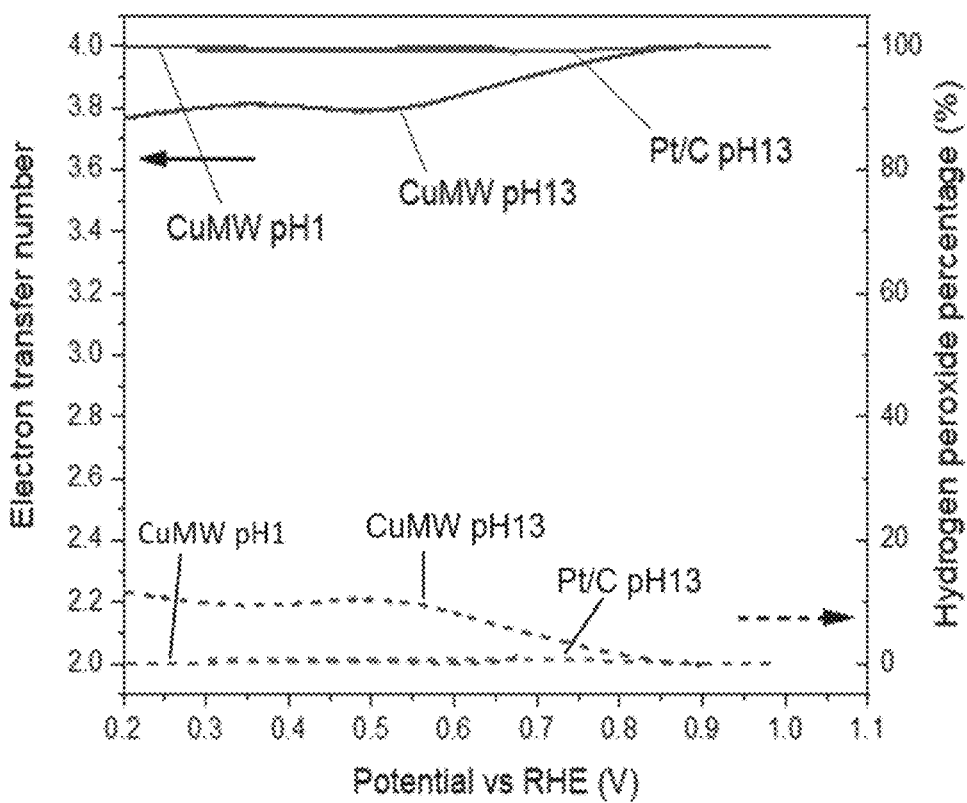

The ring current due to peroxide oxidation in acidic conditions for CuMW is much lower (about 15 times lower at about 0.5 V) than that measured in alkaline solutions (FIG. 12C). Furthermore, even though the disk current due to ORR largely increases as the potential becomes more negative, the ring current remains low in the entire potential region and does not show any significant increase in the scanned potential range. The apparent electron transfer number (n), calculated from RRDE results, is 4.0 in the entire scanned potential window, similar to that observed on Pt/C catalyst (FIG. 12D). This is in high contrast to that observed in alkaline solutions. The apparent electron transfer number (n) decreased from 4.0 to 3.8 as the overpotential increased. These results clearly suggest that the CuMW has higher selectivity toward water via the desired $4e^-$ pathway in acidic conditions than that in alkaline conditions, which different from all other Cu-E-SACs reported so far and most transition metal-based E-SACs.

The extremely low current measured on the ring electrode suggests that there was either no $H_2O_2$ intermediates generated on the CuMW catalytic surface in acidic media or they were timely reduced to water due to the strong bonding strength and catalytic activity of the active centers to $H_2O_2$. This pathway has been commonly referred as an indirect (sequential 2e×2e) pathway during ORR.

Figure 14A:
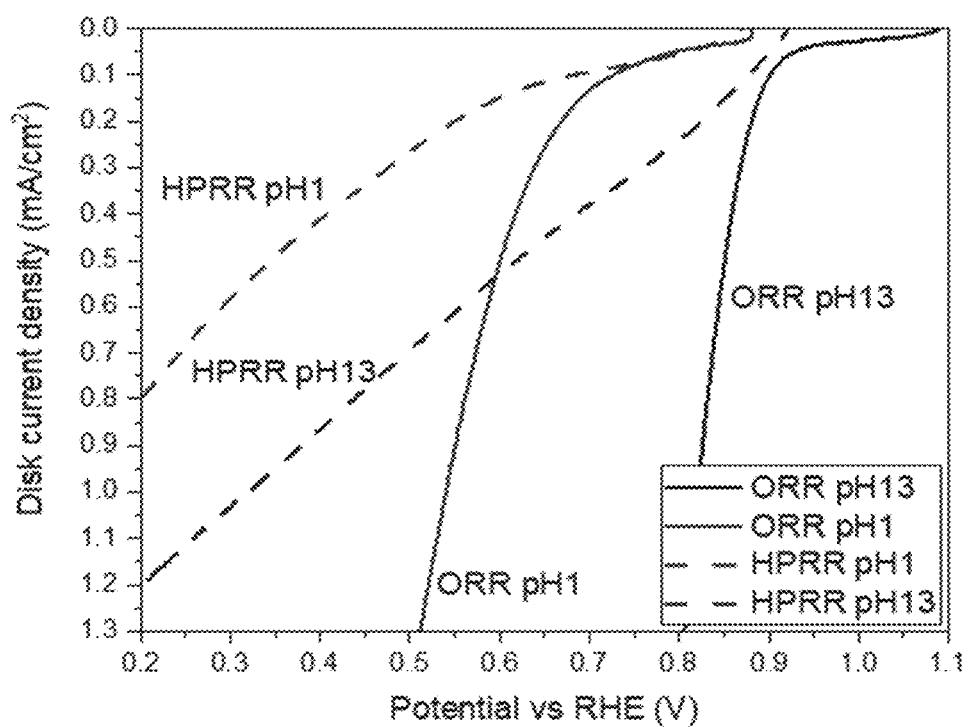
FIG. 14A provides linear sweep voltammetry data for the oxygen reduction reaction (ORR—solid line) and hydrogen peroxide reduction reaction (HPR—dash line) catalyzed by CuMW in both acidic and basic media, demonstrating a slow rate of HPR than ORR in both acidic and basic media and a lower current density for HPR in acidic media as compared to basic media.

A hydrogen peroxide reduction (HPR) reaction was performed using CuMW under the same conditions as those for ORR except the electrolytes were Ar saturated (oxygen free) and containing 2 mM hydrogen peroxide. The HPR reaction is kinetically much slower than ORR in both alkaline and acidic media (FIG. 14A). The current density for HPR in acidic is even lower than that in alkaline media. These results suggested that the Cu active sites in CuMW have a weaker interaction with $H_2O_2$ and also lower catalytic activity to reduce $H_2O_2$ to water. Without wishing to be limited by any theory, the high activity and selectivity for direct reduction of molecular oxygen to water is likely due to the strong interaction between the catalytic sites with molecular oxygen.

The oxygen absorption capability of CuMW was examined. The experimental protocol was designed according to the experiments disclosed in the literature with minor modifications to remove the influence of the decreased oxygen concentration in the electrolyte after the first cyclic voltammetry (CV) cycle (Osmieri et al., 2013, Acc Chem Res, 46:1740-1748). Specifically, CV was collected first in argon saturated 0.1 M $HClO_4$ at various scan rates (CV-Ar). Then the electrode was soaked in $O_2$ saturated electrolyte for 5 min with rotation to allow absorption of oxygen onto the catalyst surface. Subsequently, CV was collected again in oxygen free (Ar saturated), which is denoted as CV-$O_2$. The soaking and subsequent CV process was repeated with different scan rates. Subtraction of CV-Ar from the CV-$O_2$ gave the reduction current of the absorbed $O_2$, eliminating the reduction of $O_2$ diffused from the bulk solution and the charging current.

Figure 14B:
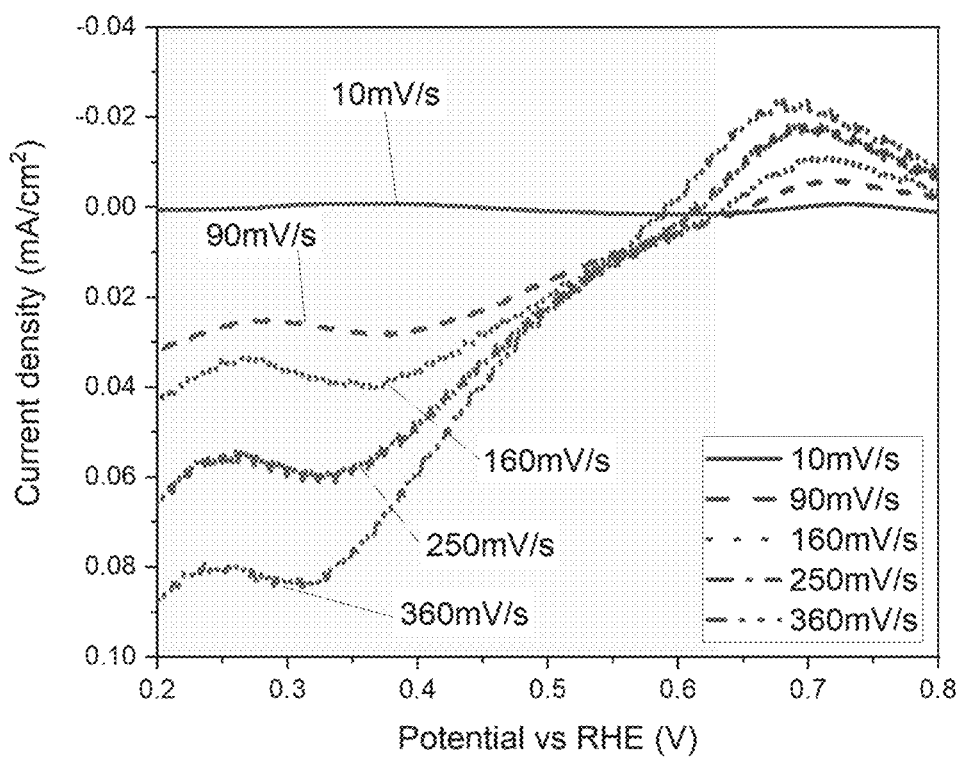
FIG. 14B provides differential cyclic voltammetry data for CuMW in Ar-saturated 0.1 M $HClO_4$, with the shaded region showing the reduction of absorbed $O_2$ on the $CuN_4$ active site.
Figure 14C:
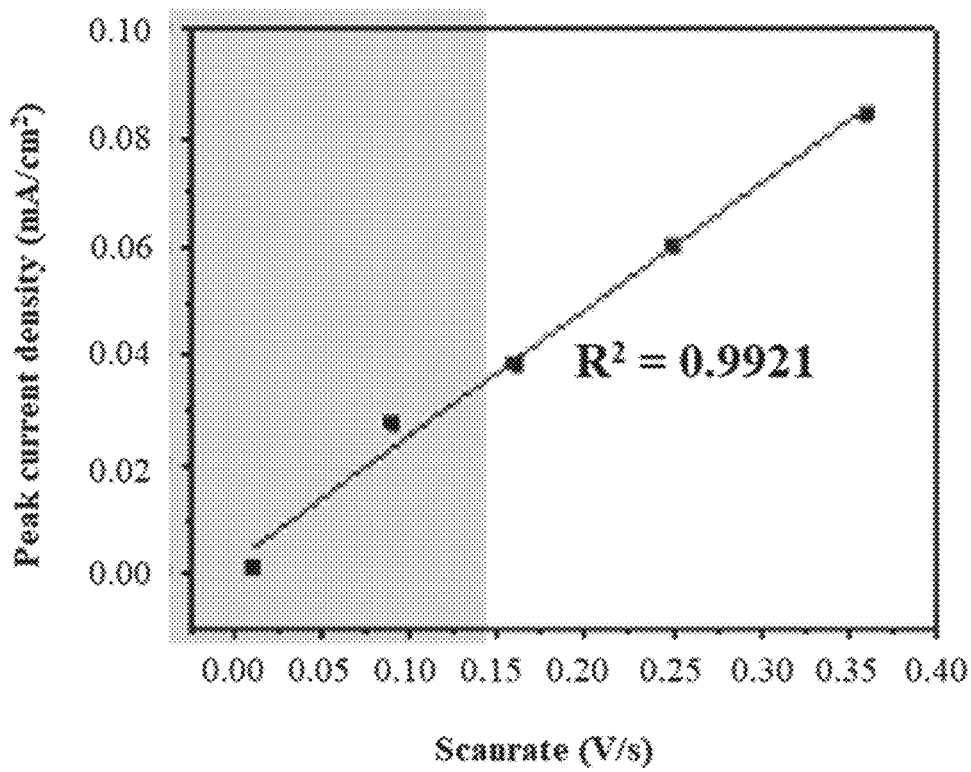
FIG. 14C shows the linear relationship between the peak current density and scan rate for the shaded region of the CuMW cyclic voltammetry data, showing the high oxygen absorption capability of the CuMW catalyst.
Figure 15:
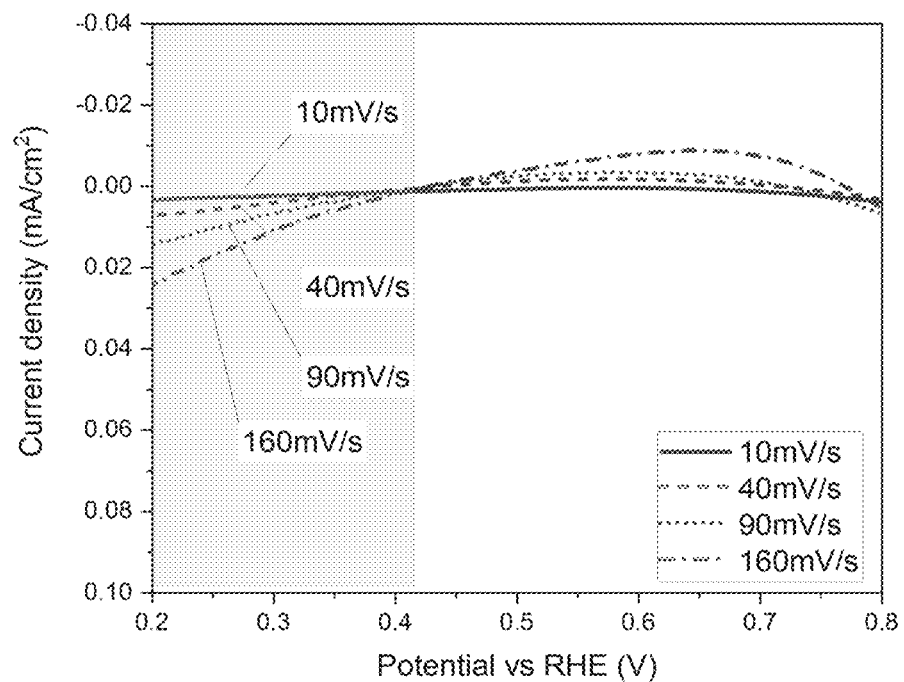
FIG. 15 provides differential cyclic voltammetry data for CuTHa, collected with the same method as CuMW, demonstrating a significantly lower current density of CuTHa as compared to CuMW.

Following this protocol, a peak was observed from about 0.55 to about 0.3 V, which was assigned as oxygen reduction (FIG. 14B). Its peak current density ($I_p$) varied linearly with the scan rate v (instead of the square root of the scan rate, $v^{1/2}$), which is a characteristic of surface bound species, further confirmed that the measured ORR current indeed results from oxygen molecules which have already absorbed on the catalytic surface (FIG. 14B). $O_2$ absorption on the Cu-SAC fabricated with traditional heating (CuTHa) was also studied using the same method. While an oxygen reduction current was also apparent in the differential CV of CuTHa, the current density was significantly lower than that of CuMW, indicating the weak $O_2$ absorption capability of the CuTHa (FIG. 15). The much higher peak current density in CuMW, compared to that of CuTHa, clearly demonstrates that the catalytic surface of a Cu-SAC fabricated via microwave heating has a much stronger interaction with molecular oxygen than that achieved via the traditional heating approach.

Figure 16A:
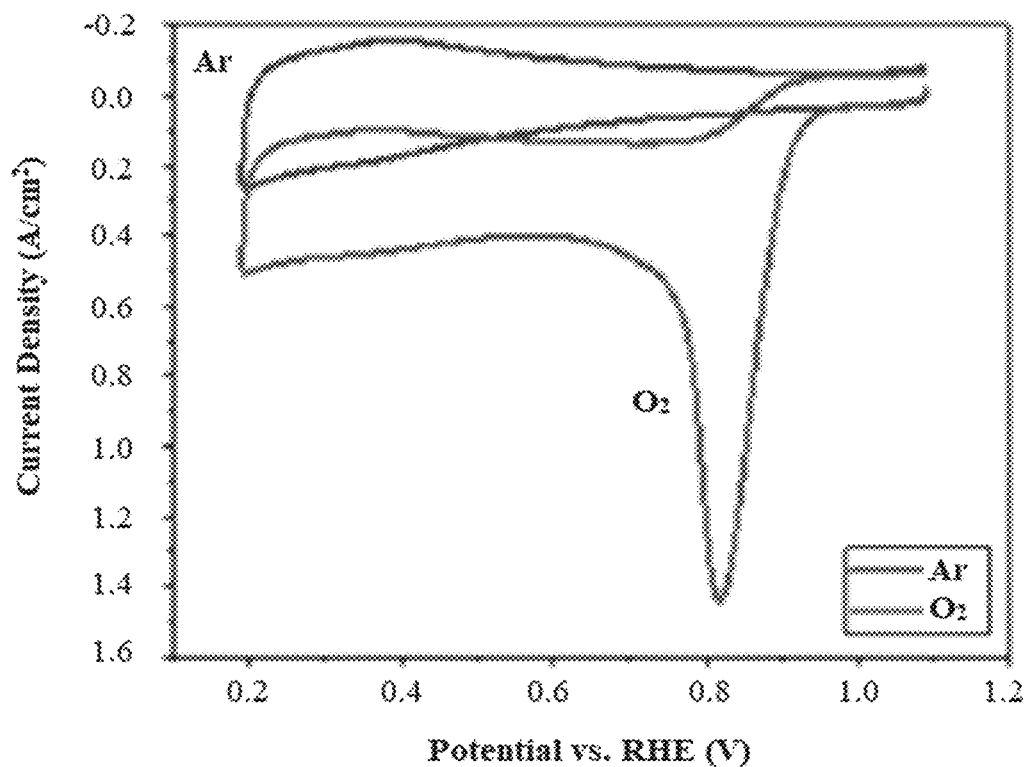
FIGS. 16A-16E provide ORR activity of FeMW.
Figure 16B:
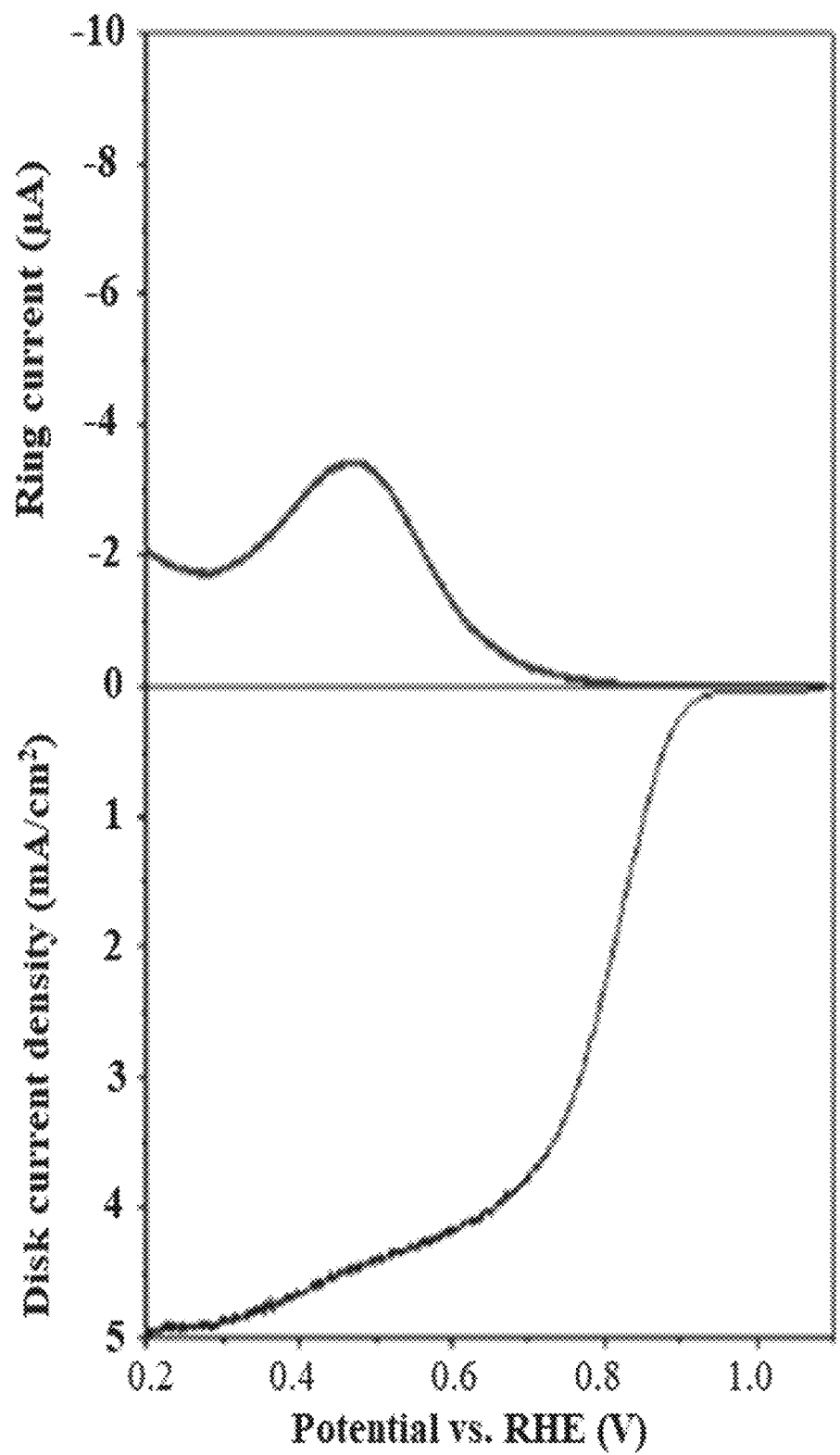

Cyclic voltammetry (CV) was performed using FeMW in both Ar- and $O_2$-saturated 0.1 KOH solutions. A large reduction peak was observed in the $O_2$-saturated electrolytes, while this peak was absent in the Ar-saturated solutions, suggesting that the FeMW catalyst is active in catalyzing molecular oxygen reduction (FIG. 16A). The onset potential was determined to be 0.95 V ($E_{onset}$=0.95 V vs. RHE).

Figure 16C:
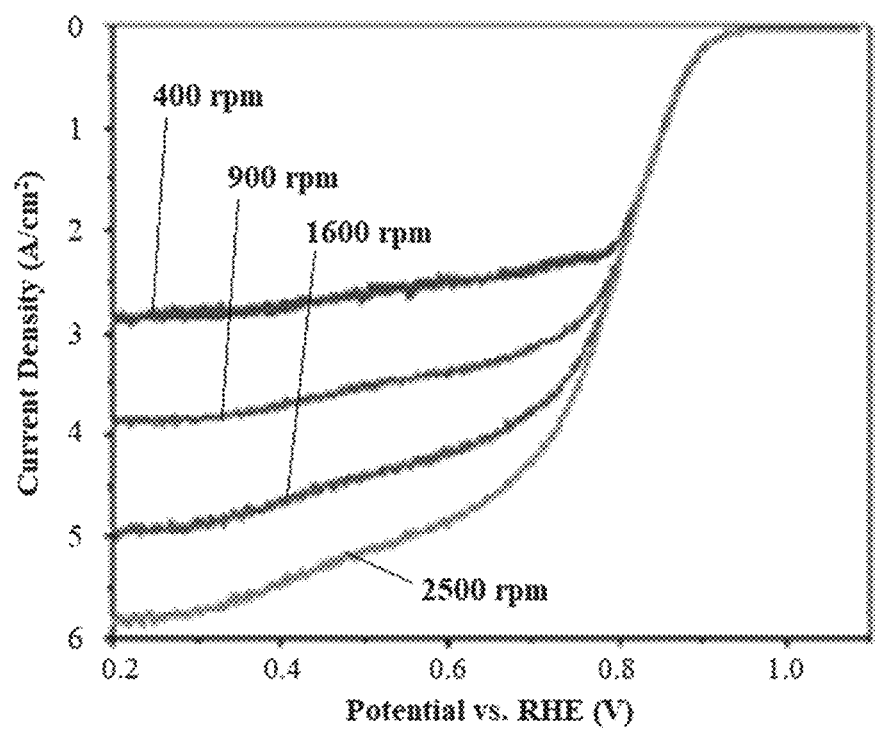
Figure 16D:
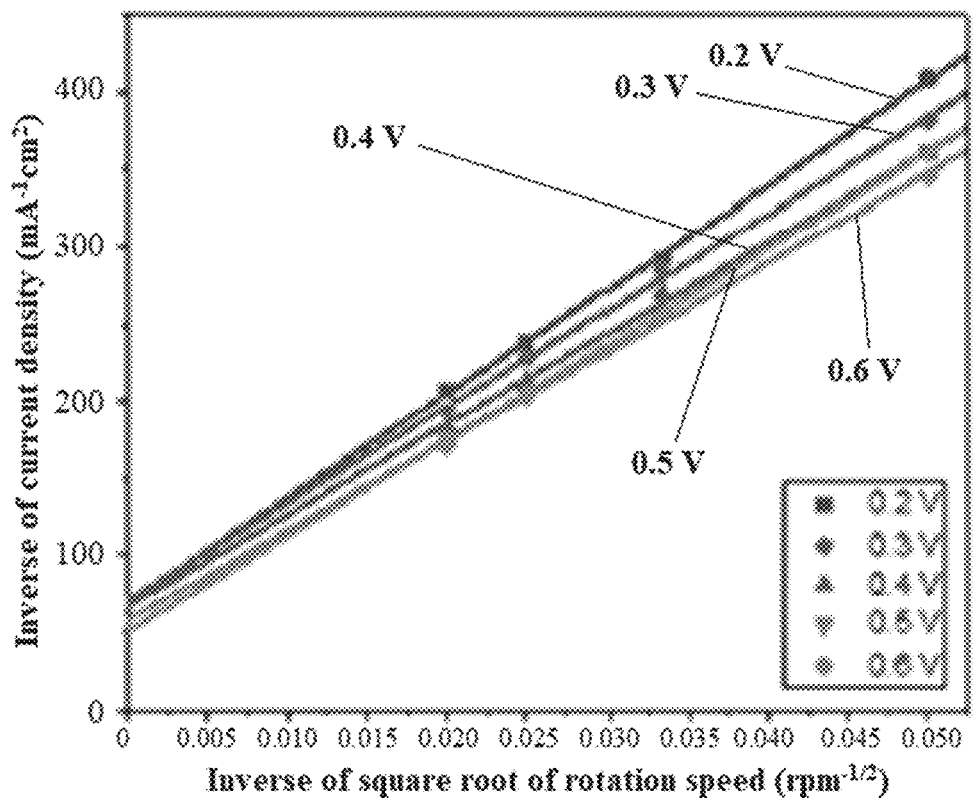
Figure 16E:
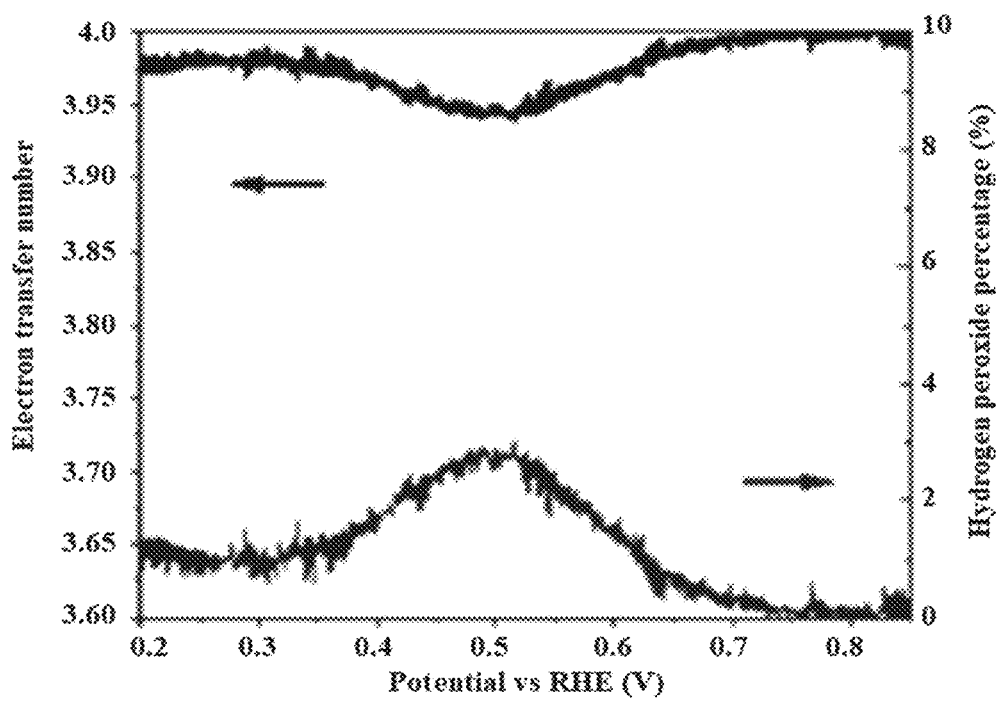

Linear sweep voltammetry (LSV) with a rotating ring-disk electrodes (RRDE) was used to study the kinetics and mechanism of the oxygen reduction reaction with FeMW. The apparent electron transfer number at 0.5 V (vs. RHE) calculated from the K-L plot was about 4 (FIGS. 16C-16D).

Figure 17A:
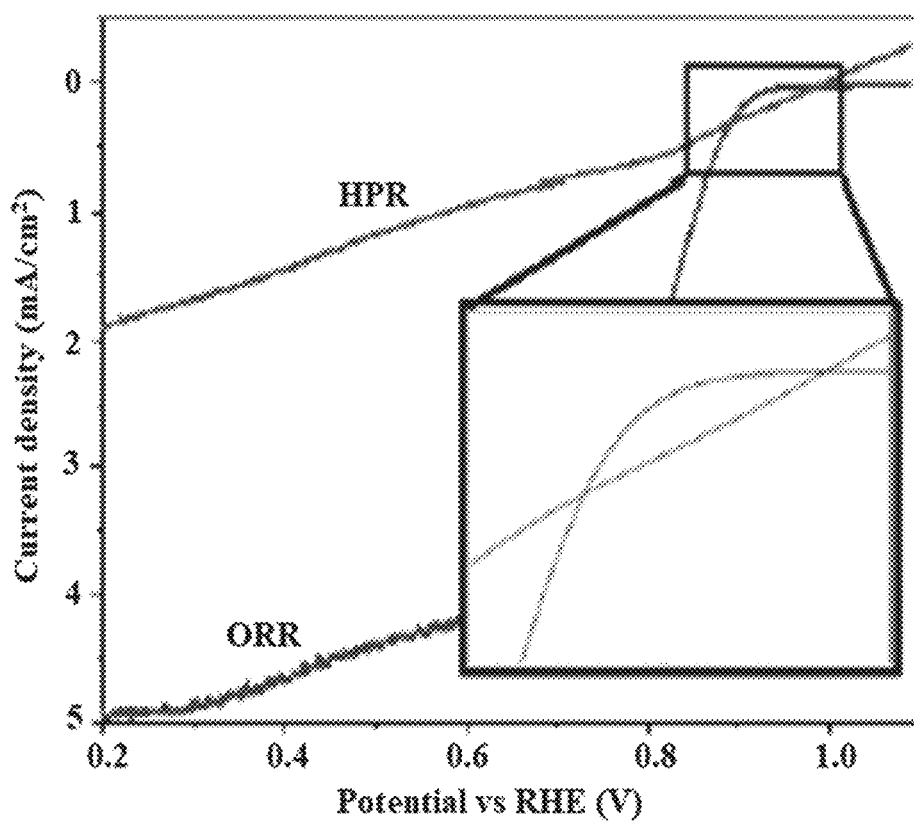
FIG. 17A provides linear sweep voltammetry of ORR and HPR of FeMW at 1600 rpm and a scan rate of 10 mV/S.
Figure 17B:
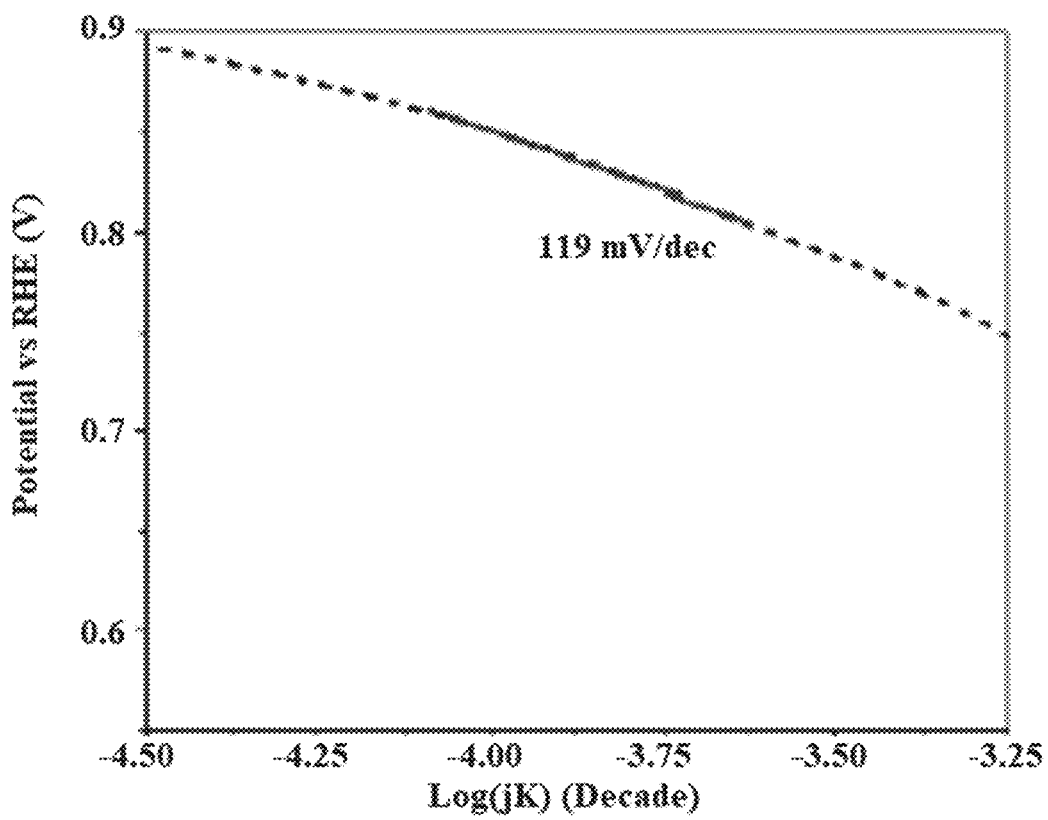
FIG. 17B provides a Tafel plot for the ORR of FeMW.
Figure 18A:
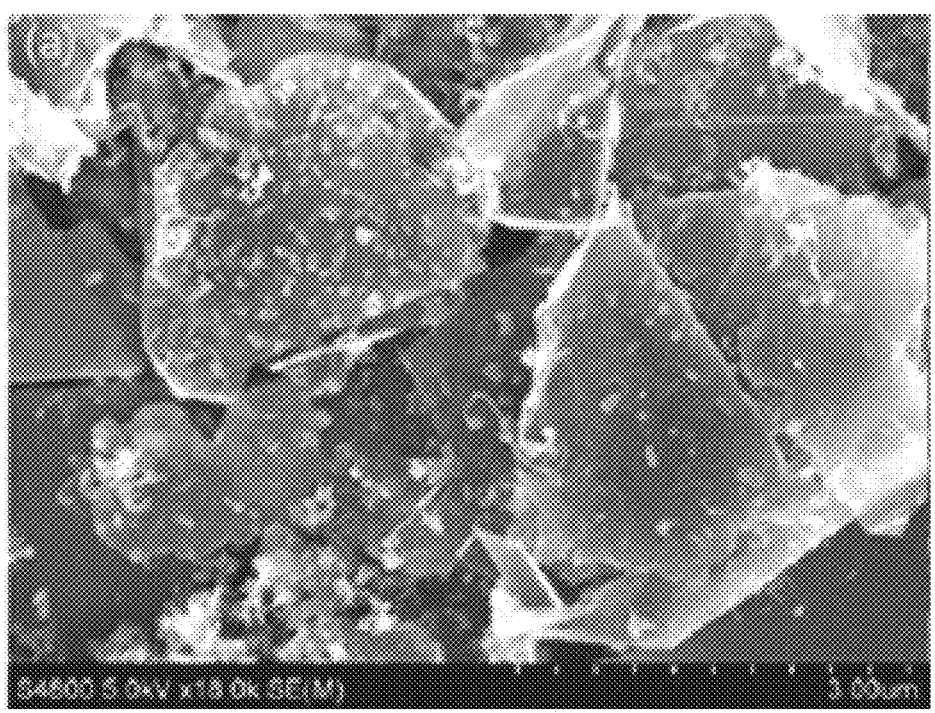
FIGS. 18A-18B provide scanning electron microscope (SEM) images of FeMW with different levels of magnification.
Figure 18B:
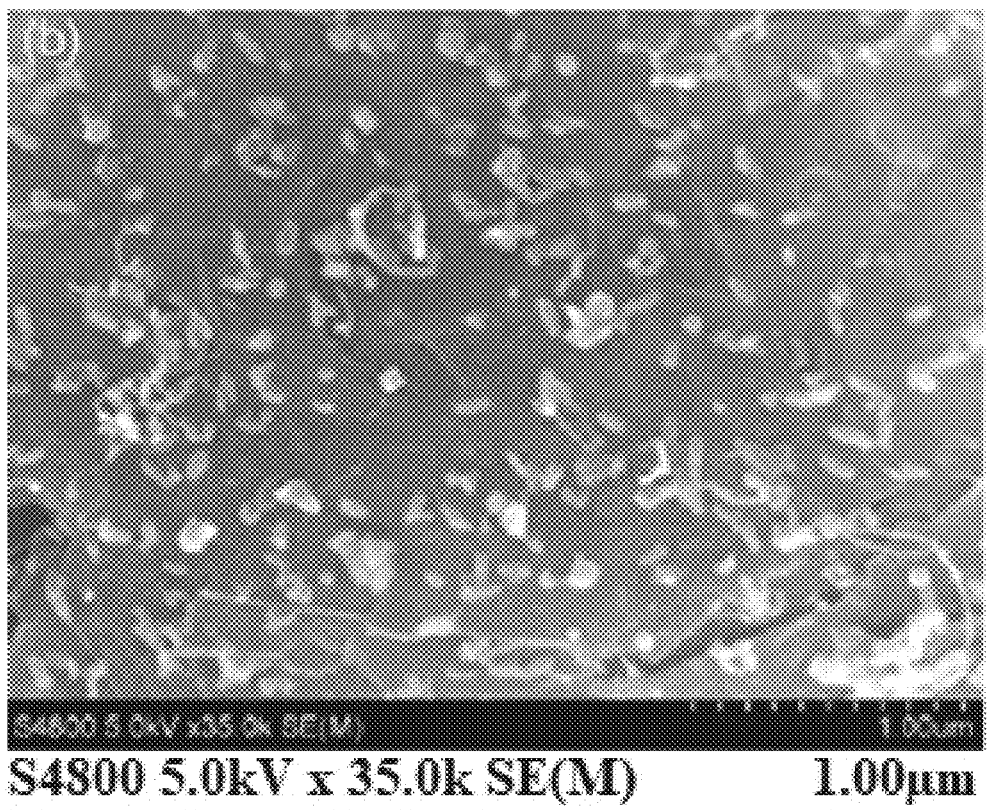

Linear sweep voltammetry was also used to study the hydrogen peroxide reduction reaction with FeMW and the result has been compared with the oxygen reduction reaction (FIG. 17A). A Tafel plot has been generated and the slope was determined to be 119 mV/dec (FIG. 17B).

Example 6: Scanning Electron Microscopy

Scanning electron microscopy images were captured using an ultra-high resolution field emission electron microscope (Hitachi S-4800). Samples were adhered to carbon tape on the AI stage without modification. Images were captured using an electron beam with an accelerating voltage of 5.0 kV.

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

Enumerated Embodiments

The following exemplary embodiments are provided, the numbering of which is not to be construed as designating levels of importance:

Embodiment 1 provides a method of incorporating at least one single atom transition metal catalytic site in a carbon nanomaterial, the method comprising mixing a metal-porphyrin complex with at least one carbon nanomaterial to form a mixture and subjecting the mixture to microwave irradiation.

Embodiment 2 provides the method of Embodiment 1, wherein the metal-porphyrin complex comprises Formula I:

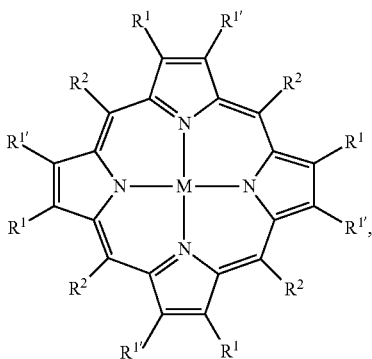

Formula I wherein:
R¹ and R¹' are each independently selected from the group consisting of H, C(=O)OR, C(=O)NR$_2$, $C_1$-$C_{10}$ alkyl, and $C_6$-$C_{10}$ aryl,
  wherein each adjacent pair of R¹ and R¹' independently optionally combines to form an optionally substituted phenyl ring or optionally substituted $C_4$-$C_8$ cycloalkyl or $C_5$-$C_8$ cycloalkenyl ring (wherein the formed ring is fused to the pyrrole ring to which R¹ and R¹' are attached),
  wherein the $C_6$-$C_{10}$ aryl and $C_1$-$C_{10}$ alkyl are each optionally substituted with at least one substituent independently selected from the group consisting of OMe, C(=O)OR, and C(=O)NR$_2$;
each occurrence of R² is independently selected from the group consisting of H, C(=O)OR, C(O)NR$_2$, $C_1$-$C_{10}$ alkyl, and $C_6$-$C_{10}$ aryl,
  wherein the $C_6$-$C_{10}$ aryl and $C_1$-$C_{10}$ alkyl are each optionally substituted by at least one substituent independently selected from the group consisting of OMe, C(O)OR, and C(O)NR$_2$,
each occurrence of R is independently selected from the group consisting of H and $C_1$-$C_{10}$ alkyl; and
M is a transition metal.

Embodiment 3 provides the method of any of Embodiments 1-2, wherein the metal-porphyrin complex comprises Formula III:

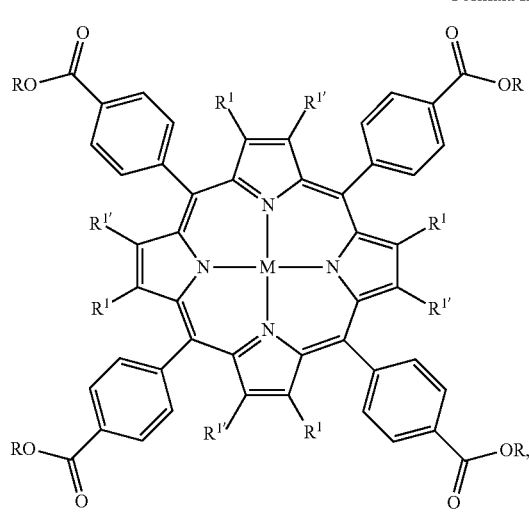

Formula III wherein:
R¹ and R¹' are each independently selected from the group consisting of H, $C_1$-$C_{10}$ alkyl, and $C_6$-$C_{10}$ aryl,
  wherein each adjacent pair of R¹ and R¹' independently optionally combines to form an optionally substituted phenyl ring or optionally substituted $C_4$-$C_8$ cycloalkyl or $C_5$-$C_8$ cycloalkenyl ring (wherein the formed ring is fused to the pyrrole ring to which R¹ and R¹' are attached),
  wherein the $C_6$-$C_{10}$ aryl and $C_1$-$C_{10}$ alkyl are each optionally substituted with at least one substituent independently selected from the group consisting of F, Cl, Br, I, CN, NO$_2$, and OMe;
each occurrence of R is independently selected from the group consisting of H or $C_1$-$C_{10}$ alkyl; and
M is a transition metal selected from the group consisting of Cr, Mo, W, Mn, Tc, Re, Fe, Ru, Os, Co, Rh, Ir, Ni, Pd, Pt, Cu, Ag, and Au.

Embodiment 4 provides the method of any of Embodiments 1-3, wherein at least one of:
  (a) each occurrence of R¹ and R¹' is independently H;
  (b) each occurrence of R is independently H; and
  (c) M is Cu or Fe.

Embodiment 5 provides the method of any of Embodiments 1-4, wherein the metal-porphyrin complex further comprises a metal-organic framework (MOF).

Embodiment 6 provides the method of Embodiment 5, wherein the metal-organic framework (MOF) further comprises a $Zr_6$ octahedron cluster.

Embodiment 7 provides the method of any of Embodiments 1-6, wherein the carbon nanomaterial is selected from the group consisting of graphene, holey graphene, carbon nanotubes, carbon black, active carbon, graphyne, and graphdiyne.

Embodiment 8 provides the method of any of Embodiments 1-7, wherein the mixture further comprises a second carbon nanomaterial comprising a microwave absorbing species.

Embodiment 9 provides the method of Embodiment 8, wherein the microwave absorbing species comprises at least one of graphene, holey graphene, carbon nanotubes, carbon black, active carbon, graphyne, and graphdiyne.

Embodiment 10 provides the method of any of Embodiments 1-9, wherein the mixture further comprises a solvent.

Embodiment 11 provides the method of Embodiment 10, wherein the solvent is ethanol or isopropanol.

Embodiment 12 provides the method of any of Embodiments 10-11, wherein the solvent is at least partially removed before subjecting the mixture to microwave irradiation.

Embodiment 13 provides the method of Embodiment 12, wherein the at least partial removal of solvent comprises heating the mixture to a temperature above about 78° C.

Embodiment 14 provides the method of any of Embodiments 1-13, wherein the microwave irradiation occurs with at least one of:
  (a) an output power in the range of 150 to 300 W;
  (b) a duration in the range of 3 to 30 seconds; and
  (c) a frequency of 2.45 GHz.

Embodiment 15 provides the method of any of Embodiments 1-14, wherein the microwave irradiation occurs with at least one of:
  (a) an output power of 300 W; and
  (b) a duration of 5 seconds.

Embodiment 16 provides the method of any of Embodiments 1-15, wherein the microwave irradiation occurs in single mode.

Embodiment 17 provides a single atom catalyst comprising:
a plurality of catalytic sites embedded in a holey carbon support, which comprises a plurality of nanoholes connected by nearly defect free graphene domains,
wherein each of the plurality of catalytic sites independently comprises a transition metal center which is coordinated by four planar nitrogen atoms,
wherein each nitrogen atom is bonded to the holey carbon; and
each transition metal in each of the plurality of catalytic sites is not significantly aggregated with any other transition metal within the catalyst.

Embodiment 18 provides the catalyst of Embodiment 17, wherein the holey carbon support comprises holey graphene and/or holey carbon nanotube.

Embodiment 19 provides the catalyst of any of Embodiments 1-18, wherein the transition metal is selected from the group consisting of Cr, Mo, W, Mn, Tc, Re, Fe, Ru, Os, Co, Rh, Ir, Ni, Pd, Pt, Cu, Ag, and Au.

Embodiment 20 provides the catalyst of Embodiment 19, wherein the transition metal is Cu or Fe.

The disclosures of each and every patent, patent application, and publication cited herein are hereby incorporated herein by reference in their entireties. While this disclosure has been disclosed with reference to specific embodiments, it is apparent that other embodiments and variations of this disclosure may be devised by others skilled in the art without departing from the true spirit and scope of the disclosure. The appended claims are intended to be construed to include all such embodiments and equivalent variations.

What is claimed is:

1. A method of incorporating at least one single atom transition metal catalytic site in a carbon nanomaterial, the method comprising
   (a) forming a mixture consisting of a metal organic framework (MOF), the carbon nanomaterial, and optionally a solvent, wherein:
      the optional solvent is selected from the group consisting of ethanol and isopropanol;
      the carbon nanomaterial is at least one selected from the group consisting of graphene, holey graphene, carbon nanotubes, carbon black, active carbon, graphyne, and graphdiyne; and
      the MOF consists of a $Zr_6$ octahedron cluster and a transition metal-porphyrin complex of Formula I:

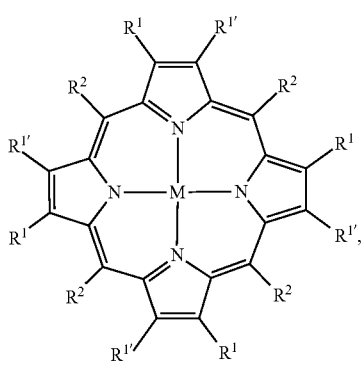

Formula I wherein:
R$^1$ and R$^{1'}$ are each independently selected from the group consisting of H,
C(=O)OR, $C_1$-$C_{10}$ alkyl, and $C_6$-$C_{10}$ aryl,
   wherein each adjacent pair of R$^1$ and R$^{1'}$ independently optionally combines to form an optionally substituted phenyl ring, optionally substituted $C_4$-$C_8$ cycloalkyl, or optionally substituted $C_5$-$C_8$ cycloalkenyl ring (wherein the formed ring is fused to the pyrrole ring to which R$^1$ and R$^{1'}$ are attached),
   wherein the $C_6$-$C_{10}$ aryl and $C_1$-$C_{10}$ alkyl are each optionally substituted with at least one substituent independently selected from the group consisting of OMe, and C(=O)OR;
each occurrence of R$^2$ is independently selected from the group consisting of H, C(=O)OR, $C_1$-$C_{10}$ alkyl, and $C_6$-$C_{10}$ aryl,
   wherein the $C_6$-$C_{10}$ aryl and $C_1$-$C_{10}$ alkyl are each optionally substituted by at least one substituent independently selected from the group consisting of F, Cl, Br, I, CN, NO$_2$, OMe and C(=O)OR,
each occurrence of R is independently selected from the group consisting of H and $C_1$-$C_{10}$ alkyl; and
M is a transition metal; and
   (b) subjecting the mixture to microwave irradiation to provide an irradiated carbon nanomaterial, whereby the irradiated carbon nanomaterial comprises at least one single atom transition metal catalytic site,
wherein the irradiated carbon nanomaterial is substantially free of transition metal aggregates.

2. The method of claim 1, wherein the metal-porphyrin complex of Formula I is a metal-porphyrin complex of Formula III:

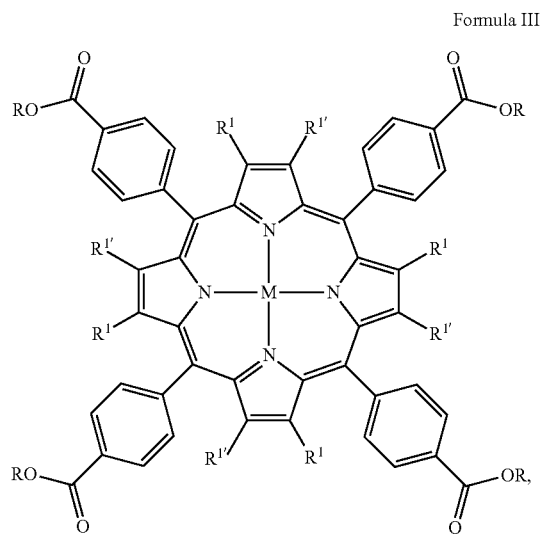

Formula III wherein:
R$^1$ and R$^{1'}$ are each independently selected from the group consisting of H, $C_1$-$C_{10}$ alkyl, and $C_6$-$C_{10}$ aryl,
   wherein each adjacent pair of R$^1$ and R$^{1'}$ independently optionally combines to form an optionally substituted phenyl ring or optionally substituted $C_4$-$C_8$ cycloalkyl or $C_5$-$C_8$ cycloalkenyl ring (wherein the formed ring is fused to the pyrrole ring to which R$^1$ and R$^{1'}$ are attached),
   wherein the $C_6$-$C_{10}$ aryl and $C_1$-$C_{10}$ alkyl are each optionally substituted with at least one substituent independently selected from the group consisting of F, Cl, Br, I, CN, NO$_2$, and OMe;

each occurrence of R is independently selected from the group consisting of H or C$_1$-C$_{10}$ alkyl; and M is at least one transition metal selected from the group consisting of Cr, Mo, W, Mn, Tc, Re, Fe, Ru, Os, Co, Rh, Ir, Ni, Pd, Pt, Cu, Ag, and Au.

3. The method of claim 2, wherein at least one of the following applies:
   (a) each occurrence of R$^1$ and R$^{1'}$ is independently H;
   (b) each occurrence of R is independently H; and
   (c) M is Cu or Fe.

4. The method of claim 1, wherein the solvent is at least partially removed before subjecting the mixture to microwave irradiation.

5. The method of claim 1, wherein the at least partial removal of solvent comprises heating the mixture to a temperature above about 78° C.

6. The method of claim 1, wherein the microwave irradiation occurs with at least one of the following:
   (a) an output power in the range of 150 to 300 W;
   (b) a duration in the range of 3 to 30 seconds; and
   (c) a frequency of 2.45 GHz.

7. The method of claim 6, wherein the microwave irradiation occurs with at least one of the following:
   (a) an output power of 300 W; and
   (b) a duration of 5 seconds.

8. The method of claim 1, wherein the microwave irradiation occurs in single mode.

9. The method of claim 1, wherein the irradiated carbon nanomaterial comprises less than 5 percent transition metal aggregate by weight in the irradiated carbon nanomaterial.

* * * * *